United States Patent
Sharp et al.

[11] Patent Number: 6,046,786
[45] Date of Patent: *Apr. 4, 2000

[54] SWITCHABLE ACHROMATIC COMPOUND RETARDER

[75] Inventors: Gary D. Sharp; Kristina M. Johnson, both of Boulder, Colo.

[73] Assignee: University Technology Corporation, Boulder, Colo.

[*] Notice: This patent is subject to a terminal disclaimer.

[21] Appl. No.: 08/901,837

[22] Filed: Jul. 28, 1997

Related U.S. Application Data

[63] Continuation of application No. 08/419,593, Apr. 7, 1995, Pat. No. 5,658,490.

[51] Int. Cl.[7] ................................................. G02F 1/1335
[52] U.S. Cl. ............................ 349/119; 349/96; 349/117; 349/121
[58] Field of Search .................................... 349/117, 119, 349/96, 121, 171; 359/63, 73

[56] References Cited

U.S. PATENT DOCUMENTS

| | | | |
|---|---|---|---|
| 4,711,530 | 12/1987 | Nakanowatari et al. | 359/63 |
| 4,770,500 | 9/1988 | Kalmanash et al. | 359/53 |
| 4,772,104 | 9/1988 | Buhrer | 350/403 |
| 4,884,876 | 12/1989 | Lipton et al. | 359/64 |
| 4,967,268 | 10/1990 | Lipton et al. | 348/56 |
| 5,020,882 | 6/1991 | Makow | 359/64 |
| 5,033,825 | 7/1991 | Ishikawa et al. | 359/63 |
| 5,117,302 | 5/1992 | Lipton et al. | 359/227 |
| 5,122,890 | 6/1992 | Makow | 359/63 |
| 5,132,826 | 7/1992 | Johnson et al. | 359/93 |
| 5,187,603 | 2/1993 | Bos | 359/73 |
| 5,231,521 | 7/1993 | Johnson et al. | 359/93 |
| 5,237,438 | 8/1993 | Miyashita et al. | 359/73 |
| 5,243,455 | 9/1993 | Johnson et al. | 359/93 |
| 5,247,378 | 9/1993 | Miller | 359/86 |
| 5,347,378 | 9/1994 | Handschy et al. | 359/53 |
| 5,528,393 | 6/1996 | Sharp et al. | 359/53 |
| 5,619,355 | 4/1997 | Sharp et al. | 349/78 |
| 5,870,159 | 2/1999 | Sharp | 349/121 |
| 5,892,559 | 4/1999 | Sharp | 349/80 |

FOREIGN PATENT DOCUMENTS

WO 90/09614  8/1990  WIPO.

OTHER PUBLICATIONS

Title, A.M., "Improvement of Birefringent Filters. 2: Achromatic Waveplates," Applied Optics (Jan. 1975) 14(1):229–237.

McIntyre, C.M. and Harris, S.E., "Achromatic Wave Plates for the Visible Spectrum," J. Opt. Soc. of America (Dec. 1968) 58(12): 1575–1580.

(List continued on next page.)

*Primary Examiner*—William L. Sikes
*Assistant Examiner*—Tarifur R. Chowdhury
*Attorney, Agent, or Firm*—Fleshner & Kim, LLP

[57] ABSTRACT

This invention provides achromatic liquid crystal compound retarders, achromatic polarization switches, and achromatic shutters using the liquid crystal compound retarders. It further provides achromatic variable retardance smectic liquid crystal retarders. The compound retarder of this invention comprises a central liquid crystal retarder unit and two external passive retarders positioned in series with and on either side of the liquid crystal retarder unit. The liquid crystal retarder unit comprises either (1) a rotatable smectic liquid crystal half-wave retarder or (2) first and second liquid crystal variable retarders having retardance switchable between zero and half-wave. The external passive retarders are equal in retardance and orientation to each other. Design equations determine the retardance of the external elements and their orientation relative to the central retarder to obtain a particular achromatic retardance for the compound structure.

26 Claims, 15 Drawing Sheets

OTHER PUBLICATIONS

Koester, Charles J., "Achromatic Combinations of Half–Wave Plates," J. Opt. Soc. Of America (Apr. 1959) 49(4):405–409.

Pancharatnam, S., "Achromatic Combinations of Birefringent Plates," Indian Academy Science Proceed. (1955) 41:130–136.

Pancharatnam, S., "Achromatic Combinations of Birefringent Plates, Part II. An Achromatic Quarter–Wave Plate," Indian Academy Science Proceed. (1955) 41:137–144.

"Achromatic phase–shifters: 2. A quantized ferroelectric liquid–crystal system", P. Hariharan et al., 2319 Optics Communications 117 (1995) May 15, Nos. 1/2, Amsterdam, NL, pp. 13–15.

"Achromatic retardation plates", Alan M. Title et al., SIPE vol. 307 Polarizers and Applications (1981), pp. 120–125.

"Improvement of Birefringent Filters. 2:Achromatic Waveplates", Alan M. Title, Jan. 1975/vol. 14, No. 1/ Applied Optics, pp. 229–237.

SWITCHABLE ACHROMATIC COMPOUND RETARDER

CROSS-REFERENCE TO RELATED APPLICATIONS

This application is a continuation of U.S. patent application Ser. No. 08/419,593, filed Apr. 7, 1995, now U.S. Pat. No. 5,658,490 incorporated by reference in its entirety herein.

FIELD OF THE INVENTION

The present invention relates to compound retarders comprising liquid crystal active retarders acting in combination with passive retarders to behave as a single achromatic retarder.

BACKGROUND OF THE INVENTION

Liquid crystal retarders are increasingly utilized within optical devices such as tunable filters, amplitude modulators and light shutters. Planar aligned smectic liquid crystal devices function as rotative waveplates wherein application of an electric field rotates the orientation of the optic axis but does not vary the birefringence. In contrast, homeotropically aligned smectic liquid crystals, homogeneous aligned nematic devices, and nematic π-cells function as variable retarders, wherein application of an electric field varies the birefringence. Chromaticity is a property of birefringent elements, passive and liquid crystal. There are two main components to chromaticity: (1) dispersion, which is the change in the birefringence ($\Delta n$) with wavelength $\lambda$; and (2) the explicit dependence of retardance on $1/\lambda$ due to the wavelength dependent optical pathlength. Both components contribute to increased birefringence with decreased wavelength. A birefringent material having a particular retardance at a design wavelength has higher retardance at shorter wavelengths and lower retardance at longer wavelengths. Chromaticity places limitations on the spectral operating range of birefringent optical devices.

Chromaticity compensation for passive retarders was addressed by S. Pancharatnam, Proc. Indian Acad. Sci. A41, 137 [1955], and by A. M. Title, Appl. Opt. 14, 229 [1975], both of which are herein incorporated by reference in their entirety. The wavelength dependence of passive birefringent materials can be reduced by replacing single retarders with compound retarders. The principle behind an achromatic compound retarder is that a stack of waveplates with proper retardance and relative orientation can be selected to produce a structure which behaves as a pure retarder with wavelength insensitive retardance. Pancharatnam showed, using the Poincare sphere and spherical trigonometry, that such a device can be implemented using a minimum of three films of identical retarder material. A Jones calculus analysis by Title (supra) verified the conditions imposed on the structure in order to achieve this result: (1) the requirement that the composite structure behave as a pure retarder (no rotation) forces the input and output retarders to be oriented parallel and to have equal retardance; and (2) first-order stability of the compound retarder optic axis and retardance with respect to wavelength requires that the central retarder be a half-wave plate. These conditions yield design equations that determine the retardance of the external elements and their orientation relative to the central retarder for a particular achromatic retardance. Because these design equations specify a unique orientation of the central retarder and a unique retardance for the external retarders, they have never been applied to active liquid crystal devices and the problem of active retarder chromaticity remains.

For the specific example of an achromatic half-wave retarder, the design equations dictate that the external retarders are also half-wave plates and that the orientation of the external retarders relative to the central retarder is $\pi/3$. By mechanically rotating the entire structure, wavelength insensitive polarization modulation is feasible. Furthermore, Title showed that the compound half-wave retarder can be halved, and one section mechanically rotated with respect to the other half to achieve achromatic variable retardance. Electromechanical rotation of such compound half-wave retarders has been used extensively to tune polarization interference filters for astronomical imaging spectrometers.

The primary application of ferroelectric liquid crystals (FLCs) has been shutters and arrays of shutters. In the current art, on- and off-states of an FLC shutter (FIG. 1) are generated by reorienting the optic axis of FLC retarder 10 between $\pi/4$ and 0 with respect to bounding crossed or parallel polarizers 20 and 22. In the off-state, x-polarized light is not rotated by the liquid crystal cell and is blocked by the exit polarizer. In the on-state the polarization is rotated 90° and is therefore transmitted by the exit polarizer.

For maximum intensity modulation, the cell gap is selected to yield a half-wave retardance at the appropriate design wavelength. The on-state transmission of x-polarized light is theoretically unity at the design wavelength, neglecting absorption, reflection and scattering losses. At other wavelengths the transmission decreases. The ideal transmission function for an FLC shutter as in FIG. 1 is given by $$T = \begin{cases} 1 - \sin^2 \delta/2 & \text{ON} \quad (\alpha = \pi/4) \\ 0 & \text{OFF} \quad (\alpha = 0) \end{cases} \quad (1)$$

where $\delta$ is the deviation from half-wave retardance with wavelength. This expression indicates a second-order dependence of transmission loss on $\delta$. The off-state transmission is in principle zero, but in practice it is typically limited to less than 1000:1 due to depolarization by defects, the existence of multiple domains having different alignments, and fluctuations in the tilt-angle with temperature.

High transmission through FLC shutters over broad wavelength bands is feasible for devices of zero-order retardance, but it is ultimately limited by the inverse-wavelength dependence of retardation and the rather large birefringence dispersion of liquid crystal materials. For instance, a visible FLC shutter device that equalizes on-state loss at 400 nm and 700 nm requires a half-wave retarder centered at 480 nm. A zero-order FLC device with this retardance, using typical FLC birefringence data, has a thickness of roughly 1.3 microns. The transmission loss at the extreme wavelengths, due to the departure from half-wave retardance, is approximately 40%. This significantly limits the brightness of FLC displays and the operating band of FLC shutters and light modulators. In systems incorporating multiple FLC devices, such as tunable optical filters or field-sequential display color shutters, this source of light loss can have a devastating impact on overall throughput and spectral purity.

SUMMARY OF THE INVENTION

This invention provides achromatic liquid crystal compound retarders, achromatic polarization switches, and achromatic shutters using the liquid crystal compound retarders. It further provides achromatic variable retarders utilizing smectic liquid crystals. An achromatic shutter according to this invention is demonstrated which provides excellent on-state transmission over the entire visible, ≧94% from 400 nm to 700 nm after normalization for polarizer loss, and high contrast, 1000:1 from 450 nm to 650 nm.

The smectic liquid crystal compound retarder of this invention comprises a central rotatable smectic liquid crystal half-wave retarder and two external passive retarders positioned in series with and on either side of the liquid crystal retarder. The external retarders are equal in retardance and oriented parallel to each other. Design equations determine the retardance of the external elements and their orientation relative to the central retarder to obtain a particular retardance for the compound structure. A reflection-mode compound achromatic retarder is constructed with a smectic liquid crystal quarter-wave retarder positioned between a single passive retarder and a reflector.

In the compound retarders of this invention there is, in general, an orientation of the central liquid crystal retarder for which the structure has maximum achromaticity in both orientation and retardance. Application of an electric field to the smectic liquid crystal cell rotates the optic axis between two or more orientations, one of which provides maximum achromaticity. Important aspects of this invention are the discoveries that (1) the composite retardance at the design wavelength does not change with rotation of the central liquid crystal retarder and (2) there are orientations of the central liquid crystal retarder for which the optic axis of the compound retarder is stable even though the composite retardance is not achromatic.

These properties are utilized in the achromatic polarization switch of this invention, comprising a linear polarizer and the compound achromatic retarder, and in the achromatic shutter of this invention, comprising the compound achromatic retarder positioned between a pair of polarizers. In one switching state (the "on-state") the compound retarder is achromatic and in a second state (the "off-state") the compound retarder is oriented parallel to one polarizer and the light therefore does not "see" this retarder. In the off-state fixed retardance with wavelength is therefore not necessary. Providing achromatic orientation of the compound retarder in the off-state yields high contrast shutters. Reflection-mode shutters are further provided in this invention.

In alternative embodiments of the liquid crystal compound retarder, the rotatable smectic liquid crystal half-wave retarder is replaced by first and second liquid crystal variable birefringence retarders. The first and second variable birefringence retarders have first and second fixed optic axis orientations, respectively, and retardances which can be switched between zero and half-wave. In operation, when one retarder is switched to zero retardance, the other is switched to half-wave, and vice-versa, so that the composite retardance of the pair is a half-wave retardance with orientation switchable between the first and second optic axis orientations.

The achromatic variable retardance smectic liquid crystal compound retarder of this invention comprises an active section rotatable with respect to a passive section. The active section comprises two liquid crystal retarders: a half-wave plate and a quarter-wave plate oriented at angles $\alpha_2$ and $\alpha_2+\pi/3$, respectively, where the angle $\alpha_2$ is electronically switchable. The passive section comprises two retarders: a quarter-wave plate and a half-wave plate oriented at angles $\alpha_1$ and $\alpha_1+\pi/3$, respectively, where the angle $\alpha_1$ is fixed. The quarter-wave plates are positioned between the half-wave plates. The composite retardance of the compound structure is $2(\pi/2-\alpha_2+\alpha_1)$. To vary the retardance, the liquid crystal retarders in the active section are both rotated.

The planar aligned smectic liquid crystal cells of this invention have continuously or discretely electronically rotatable optic axes. The smectic liquid crystal cells can utilize SmC* and SmA* liquid crystals, as well as distorted helix ferroelectric (DHF), antiferroelectric, and achiral ferroelectric liquid crystals. The variable birefringence liquid crystal cells of this invention can include homogeneously aligned nematic liquid crystals, π-cells, and homeotropically aligned smectic liquid crystal cells.

BRIEF DESCRIPTION OF THE DRAWINGS

FIG. 2, comprising

FIG. 5, comprising

FIG. 11, comprising

FIG. 12, comprising

DETAILED DESCRIPTION OF THE INVENTION

Figure 1:
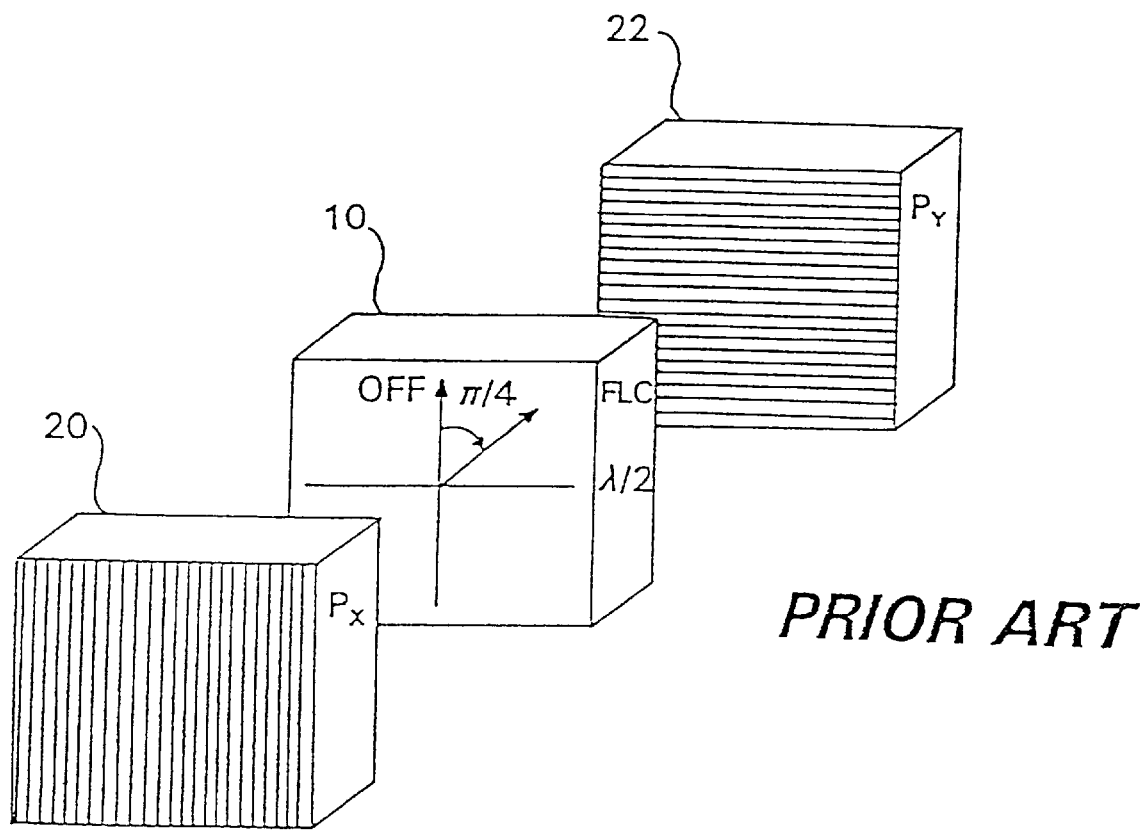
FIG. 1 is a light shutter comprising a ferroelectric liquid crystal between crossed polarizers.

The elements in the devices of this invention are optically coupled in series. The orientation of a polarizer refers to the orientation of the transmitting axis, and the orientation of a birefringent element refers to the orientation of the principal optic axis of that element. Orientations are herein defined with respect to an arbitrary axis in a plane perpendicular to the light propagation axis. In the illustrations of birefringent elements, the orientation is shown by arrow-headed lines and the retardance is labeled on the side of the element. When the retardance is switchable between two values, the values are both labeled on the side and are separated by a comma. The retardance refers to the retardance at a design wavelength. Note that a π retardance is equal to a half-wave (λ/2) retardance.

The term fixed retarder refers to a birefringent element wherein the orientation and retardance are not electronically modulated. Rotatable liquid crystal retarders of this invention have electronically rotatable orientation and fixed retardance at the design wavelength. Liquid crystal variable retarders or, equivalently, liquid crystal variable birefringence retarders have electronically variable retardance (birefringence) and fixed orientation. The term compound retarder is used for a group of two or more retarders which function as a single retarder. The composite retardance of a compound retarder is characterized by an orientation and a retardance.

The terms design wavelength and design frequency ($\upsilon_0$) refer to the wavelength and frequency at which the individual retarders within the compound retarder provide the specified retardance. The term achromatic retarder refers to a retarder with minimal first-order dependence of both the retardance and the orientation on the deviation of the incident light from the design frequency ($\Delta\upsilon/\upsilon_0$). The term achromatic orientation refers to an orientation of the optic axis with minimal first-order dependence on the deviation of the incident light from the design frequency.

A first embodiment of the liquid crystal achromatic compound retarder of this invention (FIG. 2a) comprises planar-aligned smectic liquid crystal retarder 30 having an orientation which is electronically rotatable between angles $\alpha_2$ and $\alpha_2'$. These orientations are herein termed the on-state and the off-state, respectively. Retarder 30 provides a half-wave retardance ($\Gamma_2^0=\pi$) at the design wavelength. Passive outer retarders 40 and 42, with orientation $\alpha_1$ and retardance $\Gamma_1^0$ at the design wavelength, are positioned on either side of central retarder 30. In an alternative embodiment, the outside retarders are crossed instead of parallel. In this application the design equations are derived for the case of parallel retarders. Analogous equations can be derived for crossed retarders.

In this embodiment the liquid crystal is an FLC, but it can be any material with an electronically rotatable optic axis, including planar aligned SmC* and SmA* liquid crystals, as well as distorted helix ferroelectric (DHF), antiferroelectric, and achiral ferroelectric liquid crystals. The retarder switches between at least two orientations, $\alpha_2$ and $\alpha_2'$. It can, depending on the liquid crystal employed and the electric field applied, rotate continuously between a range of orientations including $\alpha_2$ and $\alpha_2'$, switch between bistable states $\alpha_2$ and $\alpha_2'$, or be switched between two or more discreet but not necessarily stable orientations.

In a second embodiment of the achromatic retarder (FIG. 2b), rotatable retarder 30 is replaced by variable retarders 31 and 33 having fixed orientations of $\alpha_2$ and $\alpha_2'$, respectively. The retardance of 31 and 33 can be switched between zero and half-wave. The retardances are synchronously switched, which as used herein means that when one has zero retardance the other has half-wave retardance and vice-versa. Thus the composite retardance of 31 and 33 is always a half-wave and the composite orientation is switchable between $\alpha_2$ and $\alpha_2'$.

Liquid crystal variable retarders 31 and 33 can include, but are not limited to, homogeneously aligned nematic cells, nematic π-cells, and homeotropically aligned smectic liquid crystal retarders. As is known in the art, homogeneously aligned nematic cells and nematic π-cells are sometimes incapable of being electrically driven to zero retardance. In this case, the liquid crystal cell can be combined ("shimmed") with a passive retarder to compensate for the residual retardance. The passive retarder is oriented orthogonal to the liquid crystal retarder if the birefringence has the same sign and parallel if the birefringence has opposite sign. In the present invention, variable retarders 31 and 33 optionally include passive retarders to compensate for non-zero residual retardance.

Figure 2A:
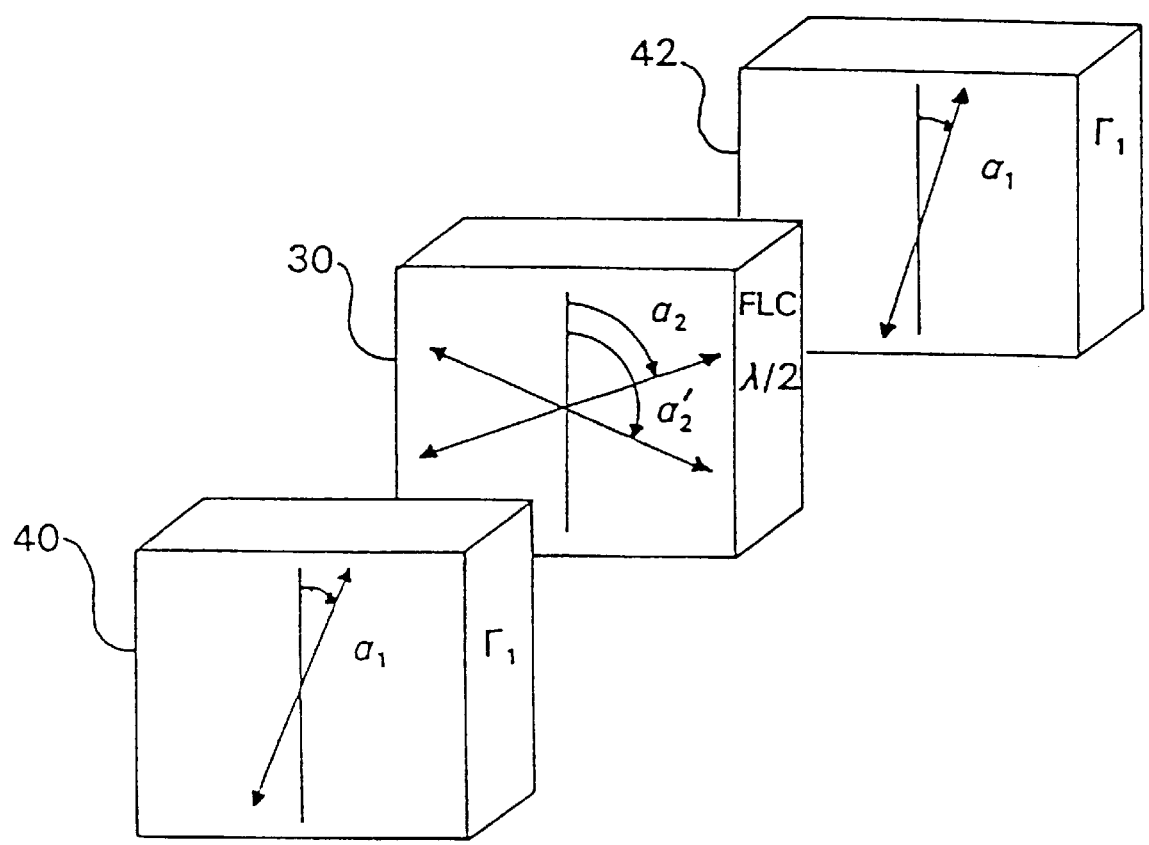
FIGS. 2a–2b, is an achromatic active compound retarder comprising (a) a rotatable smectic liquid crystal half-wave plate and two passive retarders or (b) two liquid crystal variable retarders and two passive retarders.
Figure 2B:
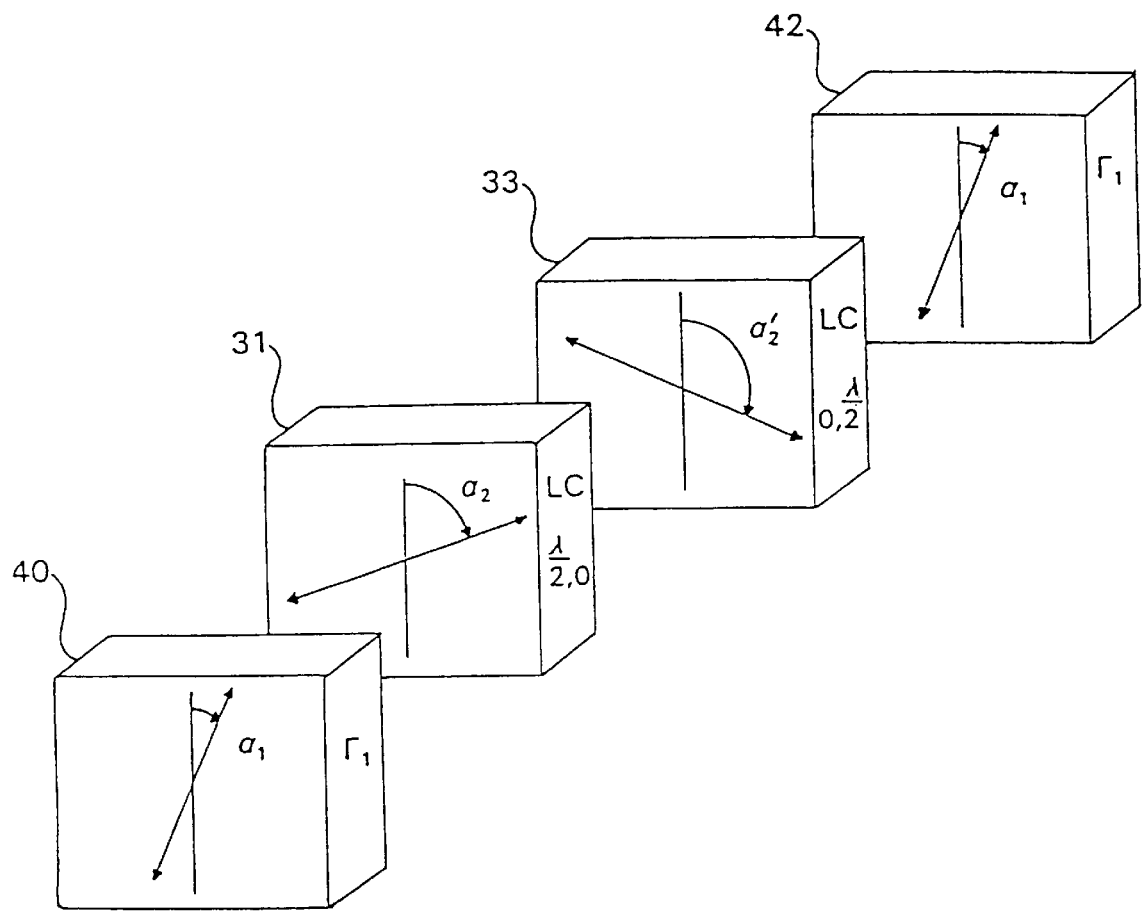

This invention is described herein with the rotatable retarder (FIG. 2a) as the representative species of FIGS. 2a–b. It is to be understood that in all embodiments of the present invention, a liquid crystal rotatable retarder can, in the manner of FIG. 2b, be replaced by a pair of liquid crystal variable retarders. The species of FIG. 2a is preferred for several reasons. The construction is simpler because it uses a single liquid crystal cell instead of two active cells. In addition, the switching speed of smectic liquid crystals is orders of magnitude faster than nematics. Finally, the field of view is greater.

The passive outer retarders can be any birefringent material. Suitable materials include crystalline materials such as mica or quartz, stretched polymeric films such as mylar or polycarbonates, and polymer liquid crystal films. In a preferred embodiment, the dispersion of the passive retarders is approximately matched to the liquid crystal dispersion. Mylar, for example, has a similar dispersion to some FLCs.

The compound retarder of this invention is designed to be achromatic in the on-state when the central retarder is oriented at $\alpha_2$. For achromaticity of the orientation and retardance, one solution for the relative orientations of the retarders is:

$$\cos 2\Delta = -\pi/2\Gamma_1^0 \qquad (2)$$

where $\Delta=\alpha_2-\alpha_1$. In addition there are isolated orientations for specific design frequencies that also yield achromatic orientation and retardance. The retardance, $\Gamma$, of the compound retarder is obtained from $$\cos(\Gamma/2) = \frac{\pi}{2}\frac{\sin\Gamma_1^0}{\Gamma_1^0} \qquad (3)$$

The orientation, $\Omega+\alpha_1$, of the compound retarder is obtained from $$\tan 2(\Omega) = \frac{\tan 2\Delta}{\cos\Gamma_1^0} \qquad (4)$$

where $\Omega$ is the orientation of the compound retarder with respect to the orientation of the outside passive retarders.

Based on the above design equations, the retardance of the passive retarders and the relative orientations of the retarders can be chosen to provide the desired retardance of the compound retarder and to ensure achromaticity. For example, for an achromatic compound half-wave retarder ($\Gamma=\pi$), Eq. 3 provides the solution $\Gamma_1^0=\pi$, and Eq. 2 provides the relative orientation of the retarders as $\Delta=60°$. Eq. 4 gives the relative orientation of the compound retarder as $\Omega=30°$. Therefore, to obtain an orientation of $\Omega=\alpha_1=45°$ for the compound half-wave retarder, the passive retarders are oriented at $\alpha_1=15°$. Since $\Delta=60°$, the orientation of the central retarder must then be $\alpha_2=75°$. Similarly, for an achromatic compound quarter-wave retarder ($\Gamma=\pi/2$), the equations yield $\Gamma_1^0=115°$, $\Delta=71°$, and $\Omega=31°$. Thus, for an orientation of $\Omega+\alpha_1=45°$, the passive retarders are oriented at $\alpha_1=14°$ and the central retarder is at $\alpha_2=85°$.

In the achromatic compound retarder of this invention, the liquid crystal central retarder has an optic axis rotatable between $\alpha_2$ and $\alpha_2'$. When the liquid crystal retarder is at $\alpha_2'$, the orientation relative to the outer retarders is $\Delta'=\alpha_2'-\alpha_1$ and the orientation of the compound retarder relative to the outer retarders is $\Omega'$. Since Eq. 2 gives a unique solution for the absolute value of $\Delta$, at which the compound retarder is achromatic, it teaches against changing the orientation of the central retarder with respect to the outer retarders. An aspect of the present invention is the discovery that (1) at orientations $\alpha_2'$ of the central retarder which do not satisfy Eq. 2, the composite retardance $\Gamma$ is nevertheless unchanged at the design wavelength and (2) there are orientations $\alpha_2'$ of the central retarder for which, even though the composite retarder is not achromatic, the optic axis is stable with respect to wavelength. A further aspect of this invention is the realization that in many devices the composite retardance does not affect device output in certain switching states and therefore it need not be achromatic in those states. In particular, when the compound retarder is oriented parallel to a polarizer, the polarized light is not modulated by the retarder and hence any chromaticity of the retardance is unimportant. Only stability of the optic axis is required so that the orientation remains parallel to the polarizer throughout the operating wavelength range. These properties lead to numerous useful devices utilizing the compound retarder with a rotatable central retarder.

In a preferred embodiment of the retarder, the orientation is achromatic when the liquid crystal retarder is oriented at $\alpha_2'$. The first order term of the frequency dependence of the orientation of the retardation axis is $$\left.\frac{\partial \Omega}{\partial \epsilon}\right|_{\epsilon=0} = -e^{-i2\Gamma_1^0}\frac{\tan 2\Delta \cos^2 2\Omega \sin\Gamma_1^0}{2\cos 2\Delta}\left(\Gamma_1^0\cos 2\Delta + \frac{\pi}{2}\right) \quad (5)$$

where $\epsilon$ is the relative frequency difference $\Delta\upsilon/\upsilon_0$. Note that in the on-state, wherein Eq. 2 is satisfied, Eq. 5 gives $\partial\Omega/\partial\epsilon=0$. This confirms that the on-state orientation is achromatic. For off-state orientations, $\alpha_2'$, Eq. 5 can be used to determine the magnitude of $\partial\Omega'/\partial\epsilon$. For the special case of an achromatic half-wave retarder, $\Gamma_1^0=\pi$, and $\sin \Gamma_1^0=0$, so $\partial\Omega/\partial\epsilon=0$ for all values of $\alpha_2'$, i.e. the orientation is achromatic at all orientations.

Figure 3:
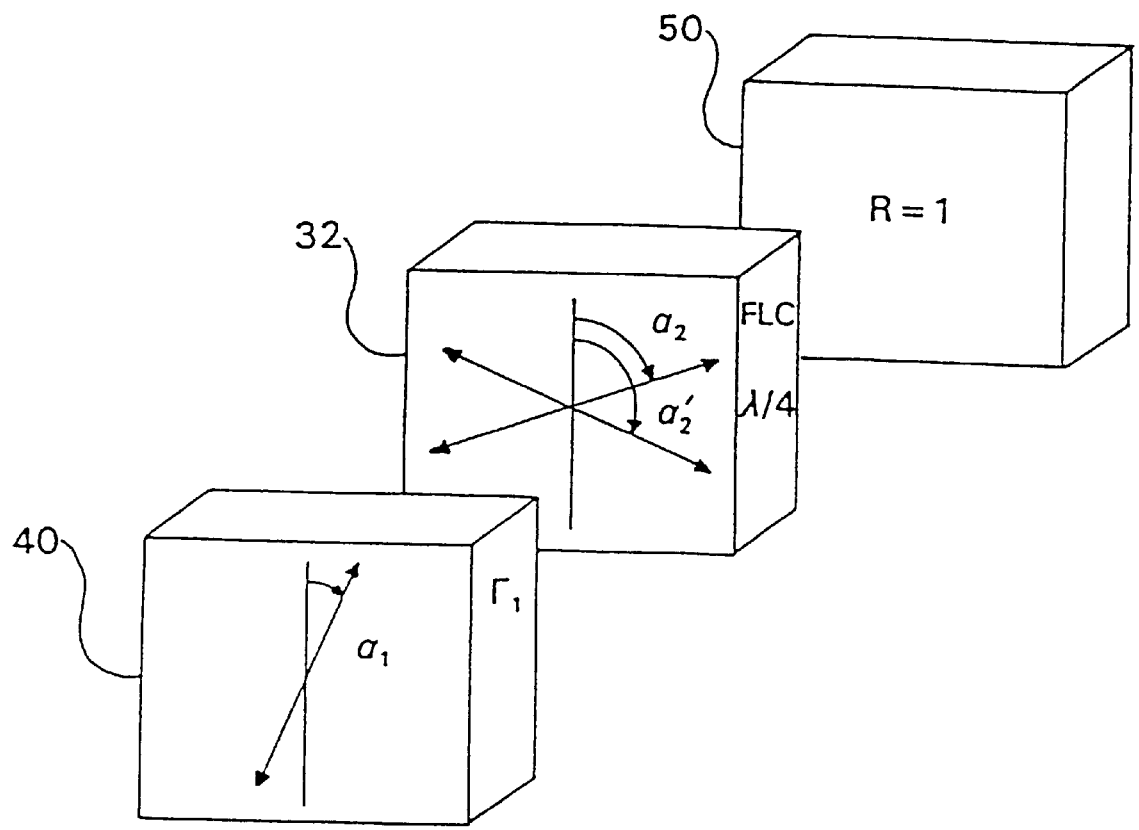
FIG. 3 is an achromatic active compound retarder in reflection mode, comprising a rotatable smectic liquid crystal quarter-wave plate, a passive retarder, and a reflector.

Because of the symmetry of the achromatic retarder, it can be implemented in reflection-mode, as illustrated in FIG. 3. The reflection-mode embodiment of the retarder of FIG. 2a utilizes a single passive retarder 40, with retardance $\Gamma_1^0$ and orientation $\alpha_1$, liquid crystal quarter-wave retarder 32, with orientation switchable between $\alpha_2$ and $\alpha_2'$, and reflector 50. Because the reflector creates a second pass through the liquid crystal quarter-wave retarder, the net retardance of the liquid crystal cell is a half wave. A forward and return pass through the reflection-mode device is equivalent to a single pass through the compound retarder of FIG. 2a. The reflection-mode embodiment of the retarder of FIG. 2b uses a pair of variable retarders switchable between zero and quarter-wave retardance in lieu of rotatable quarter-wave retarder 32 in FIG. 3. The reflector in the embodiment shown in FIG. 3 has R=1 but it can also have R<1. The reflector can transmit an optical signal for addressing the liquid crystal retarder.

This invention further includes devices employing the achromatic compound retarder described above. The polarization switch of this invention comprises a linear polarizer in combination with the achromatic compound retarder. The polarizer can be neutral with wavelength or can be a pleochroic polarizer. Light is linearly polarized by the polarizer and the polarization is modulated by the compound retarder. For the case of a half-wave retarder, the polarization remains linear and the orientation is rotated. Other retarders produce elliptically polarized light. The polarization switch functions as a polarization receiver when light is incident on the retarder rather than the polarizer. In the preferred embodiment, the compound retarder is achromatic in the on-state ($\alpha_2$) and is oriented parallel to the polarizer in the off-state ($\alpha_2'$). With this preferred off-state orientation achromaticity in the composite retardance is not needed because, with the orientation parallel to the polarizer, the polarized light does not "see" the compound retarder and is not modulated by it. In a more preferred embodiment, the orientation of the compound retarder is stable in the off-state, i.e., $\partial\Omega'/\partial\epsilon$ is small. In the most preferred embodiment the orientation is achromatic, i.e., $\partial\Omega'/\partial\epsilon$ is zero.

Figure 4:
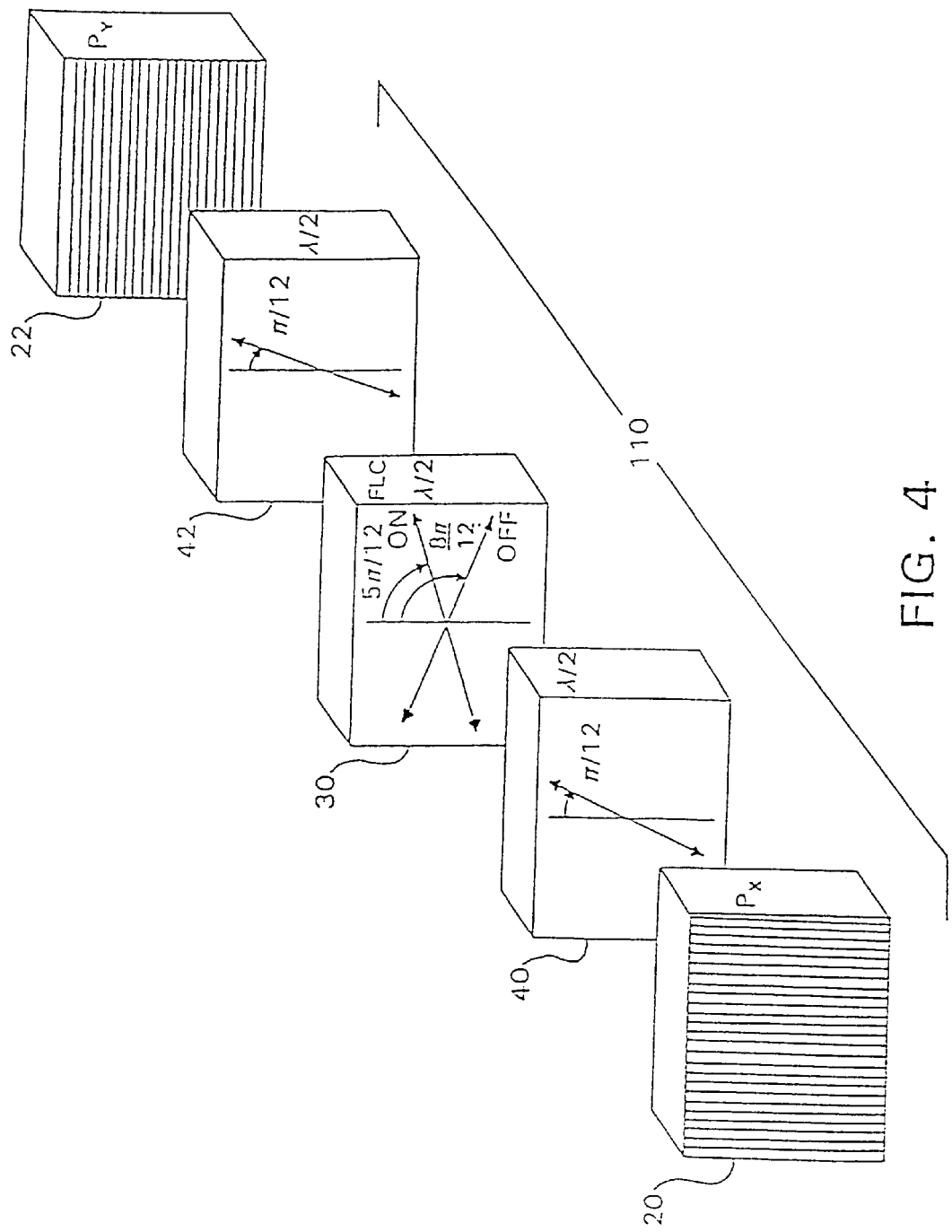
FIG. 4 is an achromatic shutter utilizing an achromatic compound retarder between crossed polarizers.

A particularly useful embodiment of the polarization switch is illustrated in FIG. 4. The polarization switch 110 comprises polarizer 20, outer retarders 40 and 42, and liquid crystal retarder 30. Passive retarders 40 and 42 are half-wave retarders ($\Gamma_1=\pi$) oriented at $\alpha_1=\pi/12$. Liquid crystal half-wave plate 30 is switchable between on- and off-state orientations of $\alpha_2=5\pi/12$ and $\alpha_2'=8\pi/12$, respectively. This gives a compound retardance $\Gamma=\lambda/2$ and orientations $\Omega+\alpha_1=\pi/4$ and $\Omega'+\alpha_1=0$. In the off-state light remains polarized along the x-axis and in the on-state it is oriented parallel to the y-axis. Because the compound half-wave retarder has an achromatic orientation for all values of $\alpha_2'$, it can be used to achromatically rotate the polarization between the input polarization and any other linear polarization.

The polarization switch can be used in combination with any polarization sensitive element. In combination with an exit polarizer it forms an achromatic shutter. The achromatic shutter of FIG. 4 employs polarizers 20 and 22. In this embodiment they are crossed but they can alternatively be parallel. This shutter is analogous to the shutter of FIG. 1: the compound retarder has a half-wave retardance, and on- and off-state composite retarder orientations of $\pi/4$ and 0, respectively. Like the shutter of FIG. 1, the shutter of FIG. 4 requires only one active retarder. The advantage is that the shutter of this invention is achromatic.

A mathematical analysis of the compound half-wave retarder and the shutter demonstrates the wavelength stability of the devices of this invention. The Jones matrix for the compound half-wave retarder is the product of the matrices representing the three linear retarders. The Jones matrix that propagates the complex cartesian field amplitude is given by chain multiplying the matrices representing the individual linear retarders. For the on- and off-states these are given, respectively, by the equations $$W_c(\pi/4)=W(\pi+\delta,\pi/12)W(\pi+\delta,5\pi/12)W(\pi+\delta,\pi/12) \quad (6)$$

and $$W_c(0)=W(\pi+\delta,\pi/12)W(\pi+\delta,2\pi/3)W(\pi+\delta,\pi/12) \quad (7)$$

where the general matrix for a linear retarder with retardation $\Gamma$ and orientation $\alpha$ is given by $$W(\Gamma,\alpha)=\begin{pmatrix} \cos\Gamma/2 - i\cos 2\alpha\sin\Gamma/2 & -i\sin 2\alpha\sin\Gamma/2 \\ -i\sin 2\alpha\sin\Gamma/2 & \cos\Gamma/2 + i\cos 2\alpha\sin\Gamma/2 \end{pmatrix} \quad (8)$$

and the absolute phase of each retarder is omitted. For the present analysis, each retarder is assumed identical in material and retardance, with half-wave retardation at a specific design wavelength. This wavelength is preferably selected to provide optimum peak transmission and contrast over the desired operating wavelength band. The retardance is represented here by the equation $\Gamma=(\pi+\delta)$, where $\delta$ is the wavelength dependent departure from the half-wave retardance. For the present work, the dispersion is modeled using a simple equation for birefringence dispersion that is suitable for both FLC and the polymer retarders used (Wu, S. T., Phys. Rev. (1986) A33:1270). Using a fit to experimental FLC and polymer spectrometer data, a resonance wavelength was selected that suitably models the dispersion of each material.

Substituting the three matrices into Eqs. 6 and 7 produces on- and off-state matrices that can be written in the general form $$W_c = \begin{pmatrix} |t_{11}|e^{-i\theta} & -i|t_{12}| \\ -i|t_{12}| & |t_{11}|e^{i\theta} \end{pmatrix} \quad (9)$$

where $|t_{ij}|$ denotes the magnitude and $\theta$ the phase of the complex $t_{ij}$ matrix components of the compound structure. The specific elements for the (achromatic) on-state are given by $$|t_{11}| = \frac{\sqrt{3}}{2}\sin^2\delta/2\sqrt{1+\frac{1}{3}\sin^2\delta/2}, \quad (10)$$

$$|t_{12}| = \sqrt{1-\frac{3}{4}\sin^4\delta/2\left(1+\frac{1}{3}\sin^2\delta/2\right)}, \quad (11)$$

$$\theta = \tan^{-1}\left[\frac{\sqrt{3}}{2}\cot\delta/2\right], \quad (12)$$

The components for the off-state are given by $$|t_{11}| = \sqrt{1-\left(1-\frac{\sqrt{3}}{2}\right)^2\sin^4\delta/2\cos^2\delta/2}, \quad (13)$$

$$|t_{12}| = \left(1-\frac{\sqrt{3}}{2}\right)\sin^2\delta/2\cos\delta/2, \quad (14)$$

$$\theta = \tan^{-1}\left[\cot\delta/2\,\frac{\cos^2\delta/2+(\sqrt{3}-1/2)\sin^2\delta/2}{\sin^2\delta/2+(\sqrt{3}-1)\cos^2\delta/2}\right]. \quad (15)$$

In the shutter device the compound retarder is placed between crossed polarizers. The Jones vector for the transmitted field amplitude is given by the matrix equation $$E(\lambda)=P_y W_c P_x E_o(\lambda). \quad (16)$$

The polarizers are taken to be ideal $$P_x = \begin{pmatrix} 1 & 0 \\ 0 & 0 \end{pmatrix}, \quad (17)$$

$$P_y = \begin{pmatrix} 0 & 0 \\ 0 & 1 \end{pmatrix}, \quad (18)$$

and the input field spectral density, $E_o(\lambda)$ is taken to be $\hat{x}$ polarized, with unity amplitude. Under these conditions, the Jones vector for the transmitted field is the off-diagonal component of $W_c$. The $\hat{y}$ component of the output Jones vector gives the field transmittance of the structure.

Since the components of $W_c$ are given above in terms of their magnitudes, the intensity transmission of the on- and off-states of the compound retarder are given by simply squaring the off-diagonal terms of Eqs. 11 and 14, or $T=|t_{12}|^2$. This gives the two intensity transmission functions of the shutter $$T = \begin{cases} 1-\frac{3}{4}\sin^4\delta/2\left(1+\frac{1}{3}\sin^2\delta/2\right) & \text{ON} \quad (\alpha_2=5\pi/12) \\ \left(1-\frac{\sqrt{3}}{2}\right)^2\sin^4\delta/2\cos^2\delta/2 & \text{OFF} \quad (\alpha_2=2\pi/3) \end{cases} \quad (19)$$

The above outputs illustrate the desirable result that the second order dependence of transmitted intensity on $\delta$ vanishes. The loss in transmission in the on-state and the leakage in the off-state have at most a fourth-order dependence on $\delta$.

Like a simple FLC shutter, the mechanism for modulating polarization with the smectic liquid crystal compound retarder is by rotating the orientation of the compound retarder rather than by varying the birefringence. This can clearly be seen by considering wavelength bands sufficiently narrow that the second (and higher) order terms of the Jones matrices in $\delta$ can be neglected. In this instance the matrices representing on- and off-states reduce respectively to $$W_c = \begin{pmatrix} 0 & -i \\ -i & 0 \end{pmatrix}, \quad (20)$$

and $$W_c = \begin{pmatrix} e^{-i\theta} & 0 \\ 0 & e^{i\theta} \end{pmatrix}. \quad (21)$$

The on-state matrix reduces, to this degree of approximation, to an ideal achromatic half-wave retarder oriented at $\pi/4$, while the off-state matrix reduces to an ideal linear retarder oriented at 0, with retardation $2\theta$. Since only an off-diagonal component is utilized in a shutter implementation, the output is ideal to this degree of approximation.

The elimination of the second order term is achieved using a 3-element structure that achieves ideal half-wave retardation at two wavelengths, rather than a single wavelength for the simple FLC shutter. This behavior can be seen by slightly varying the relative orientation of the central and exterior retarders in the on-state. The two ideal transmission states, as well as the two null states, can be further separated in this way, increasing the operating band but producing a more pronounced dip (leakage) between maxima (nulls).

Figure 5A:
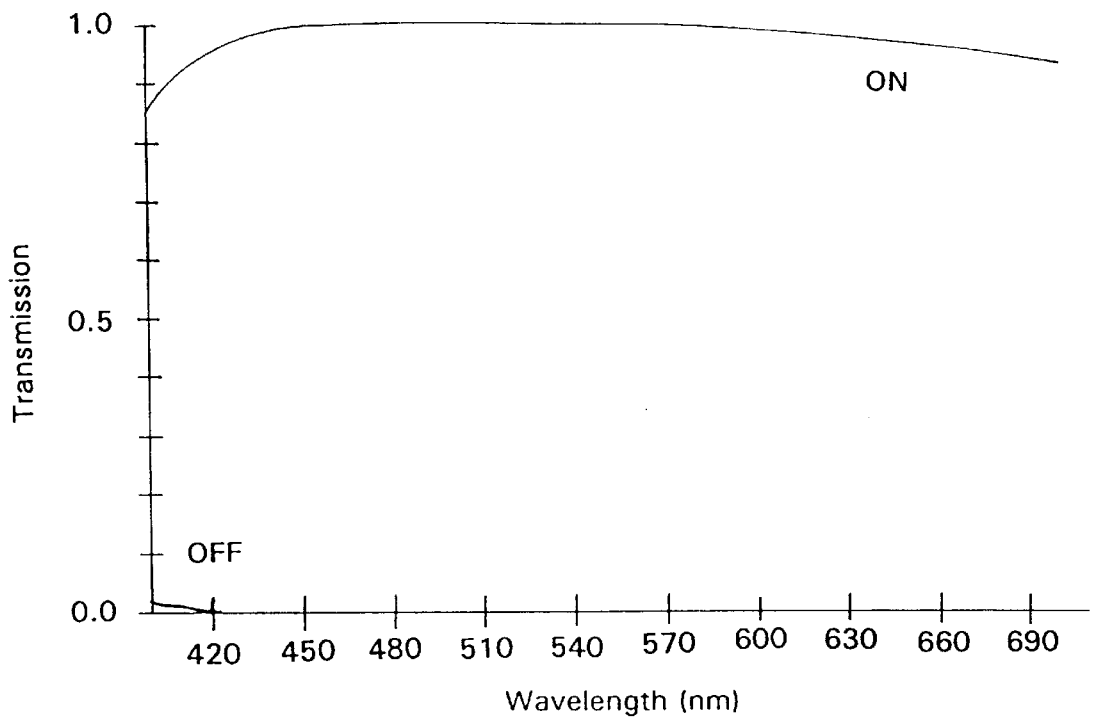
FIGS. 5a–5d, is the calculated on- and off-state transmission spectra of crossed polarizer shutters having (a) an achromatic compound retarder and (b) a single retarder, and of parallel retarder shutters having (c) an achromatic compound retarder and (d) a single retarder.
Figure 5B:
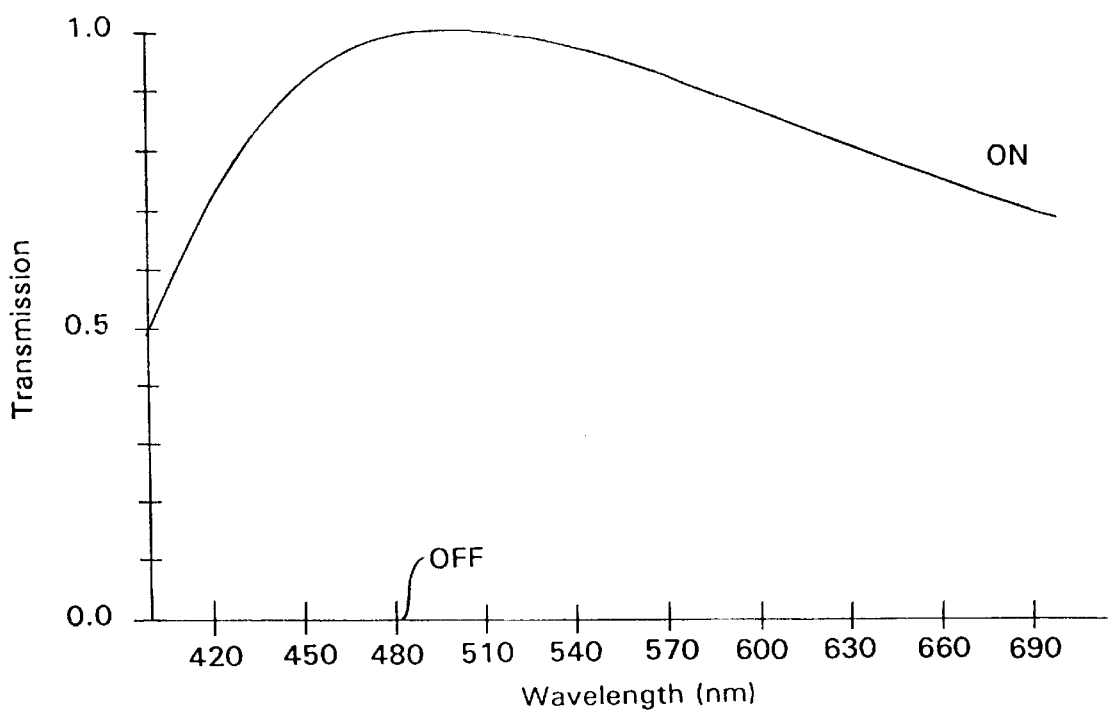
Figure 5C:
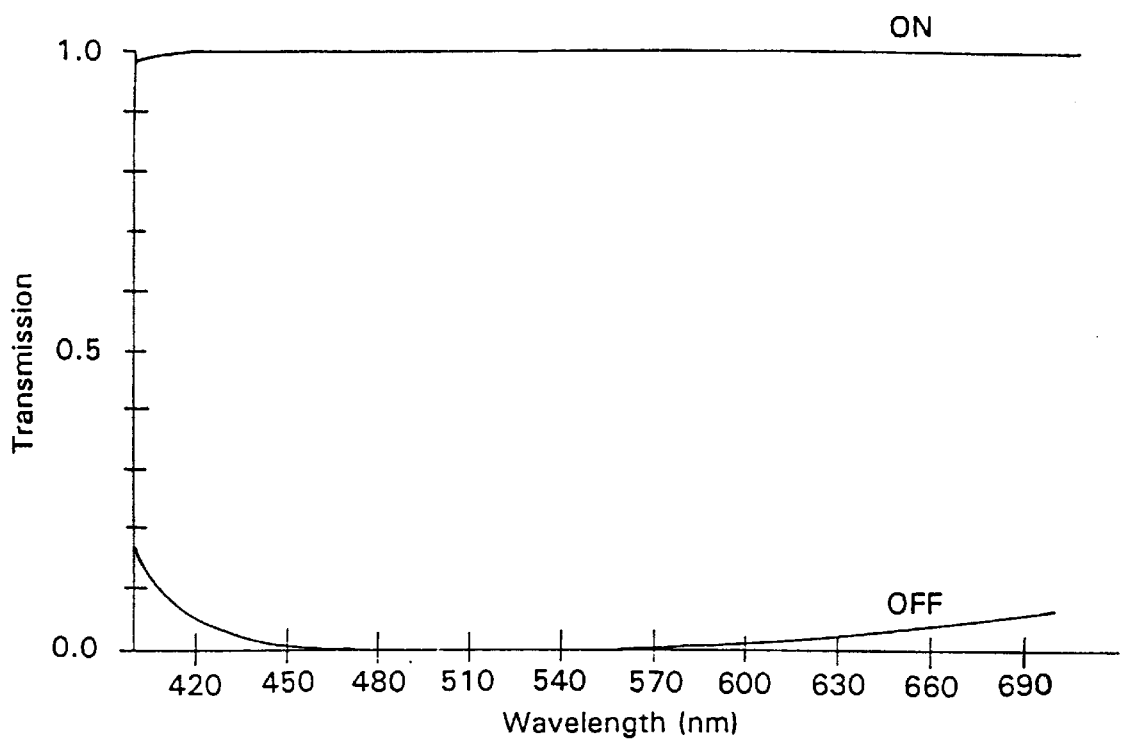
Figure 5D:
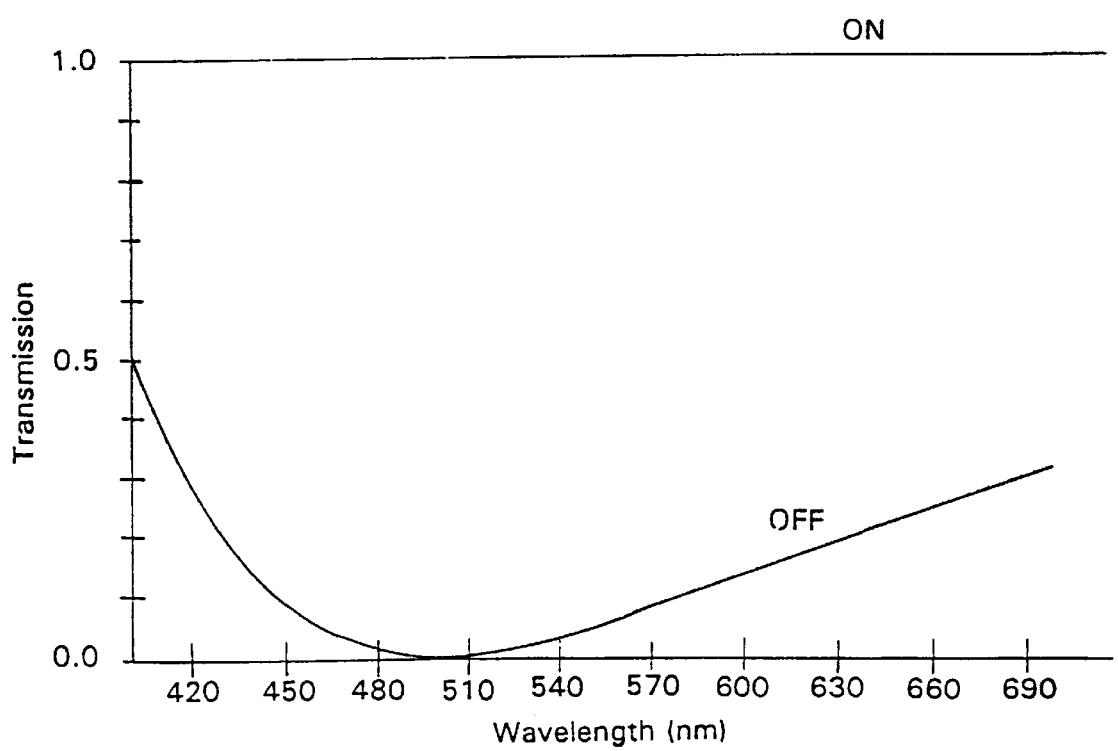

Based on the above equations, comparisons can be drawn between the compound retarder shutter and the conventional FLC shutter. A 10% loss in transmission for a conventional shutter occurs for a retardation deviation of $\delta=37°$, while the same loss for the achromatic shutter occurs for $\delta=72°$. This is very nearly a factor of two increase in $\delta$. Using a computer model for the structures, the transmission spectrum (FIG. 5a) for an achromatic shutter optimized for visible operation (400–700 nm) has a 90% transmission bandwidth of 335 nm (409–744 nm), while the spectrum (FIG. 5b) for a conventional shutter with a design wavelength of 480 nm has a 90% bandwidth of 122 nm (433–555). The result is a factor of 3.75 increase in bandwidth. Calculated spectra for parallel polarizer shutters with a compound retarder (FIG. 5c) and a single retarder (FIG. 5d) show the tremendous improvement in the off-state provided by the achromatic retarder of this invention.

The increase in operating bandwidth is accompanied by a theoretical loss in contrast ratio. The first order stability requirement of the optic axis allows off-state leakage due to the presence of higher order terms. In practice, little if any actual sacrifice is observed when incorporating the compound retarder. An FLC optimized for visible operation (half-wave at 480 nm) gives a maximum departure in retardance of $\delta=75°$. Using this value, and assuming that the external retarders have dispersion identical to FLC, a worst-case contrast ratio of 667:1 is found for operation in the 400–700 nm band. For most of this band, theory predicts contrast far in excess of 1000:1.

The conventional and the achromatic shutters were experimentally demonstrated to verify the performance predicted by computer modeling. The FLC device was fabricated using ZLI-3654 material from E-Merck. The ITO coated substrates were spin coated with nylon 6/6 and were rubbed unidirectionally after annealing. Spacers with a diameter of 1.5 microns were dispersed uniformly over the surface of one substrate and UV cure adhesive was deposited on the inner surface of the other substrate. The substrates were gapped by applying a uniform pressure with a vacuum bag and subsequently UV cured. The FLC material was filled under capillary action in the isotropic phase and slowly cooled into the C* phase. After cooling, the leads were attached to the ITO and the device was edge-sealed. The FLC cell had a half-wave retardance at 520 nm.

A conventional shutter as in FIG. 1 was formed by placing the FLC cell with the optic axis oriented at 45° between parallel polarizers. Polaroid HN22 polarizers were used due to their high contrast throughout the visible. The structure was probed by illuminating with a 400 W Xenon arc lamp, and the transmitted light was analyzed using a SPEX 0.5 m grating spectrometer system. The on-state transmission is shown in FIG. 6b.

The achromatic shutter was subsequently assembled using the same FLC device positioned between two Nitto NRF polycarbonate retarders having half-wave retardance of 520 nm. Since the FLC device is not dispersion matched to the polymer film, a loss in contrast ratio is anticipated for the compound retarder due to increased off-state leakage. The polycarbonate films were oriented at 15° with respect to the input polarizer, which was crossed with the exit polarizer. The FLC was switched between orientations of $5\pi/12$ and $8\pi/12$. The on-state (FIG. 6a) and off-state (FIG. 7) spectra were measured. Both of these spectra were appropriately normalized to remove leakage due to non-ideal polarizers, depolarization by retarders, and the polarization dependence of the lamp spectrum.

Figure 6:
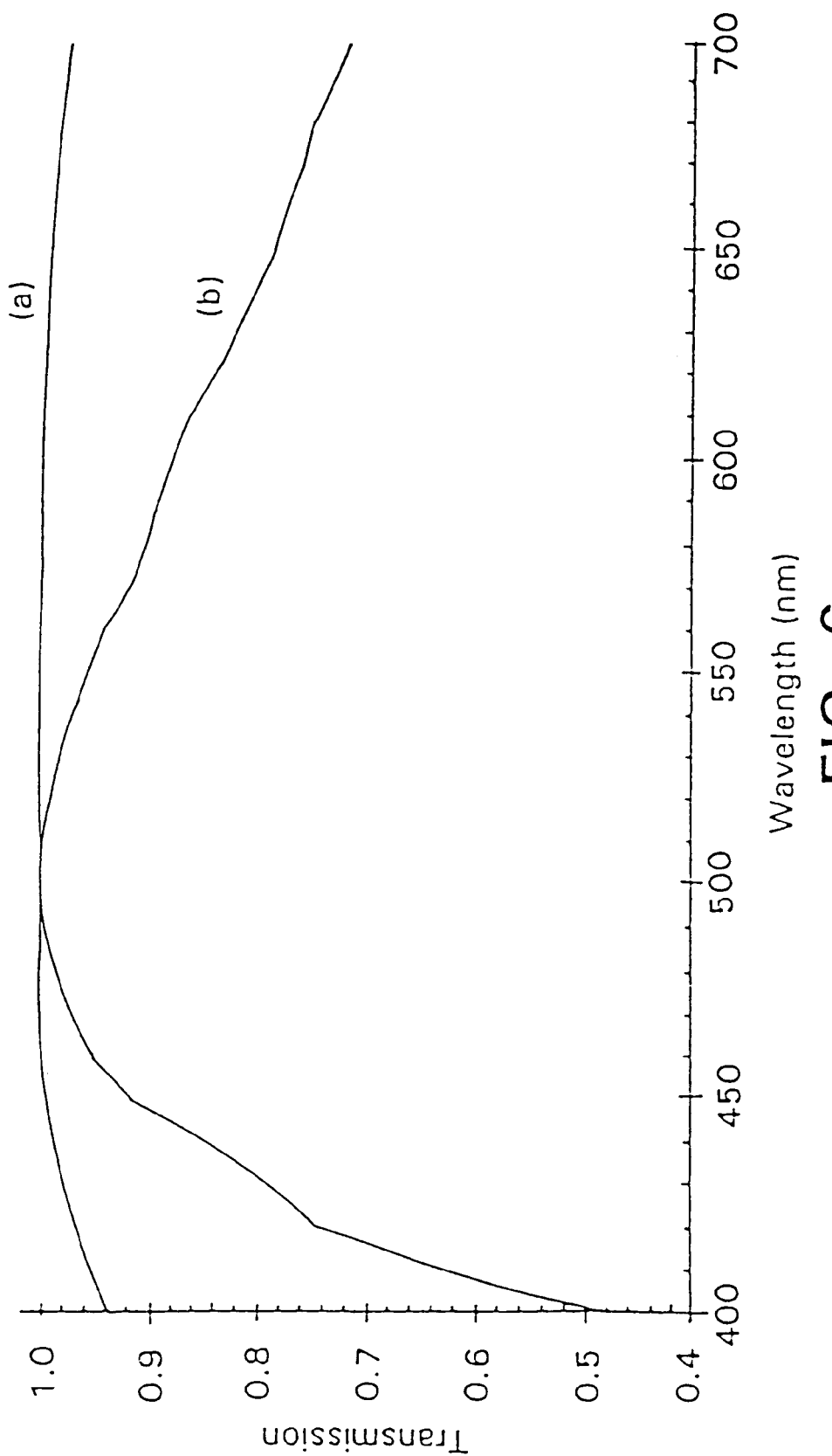
FIG. 6 is the measured on-state transmission spectra of (a) a compound-retarder achromatic shutter and (b) a single-retarder shutter.
Figure 7:
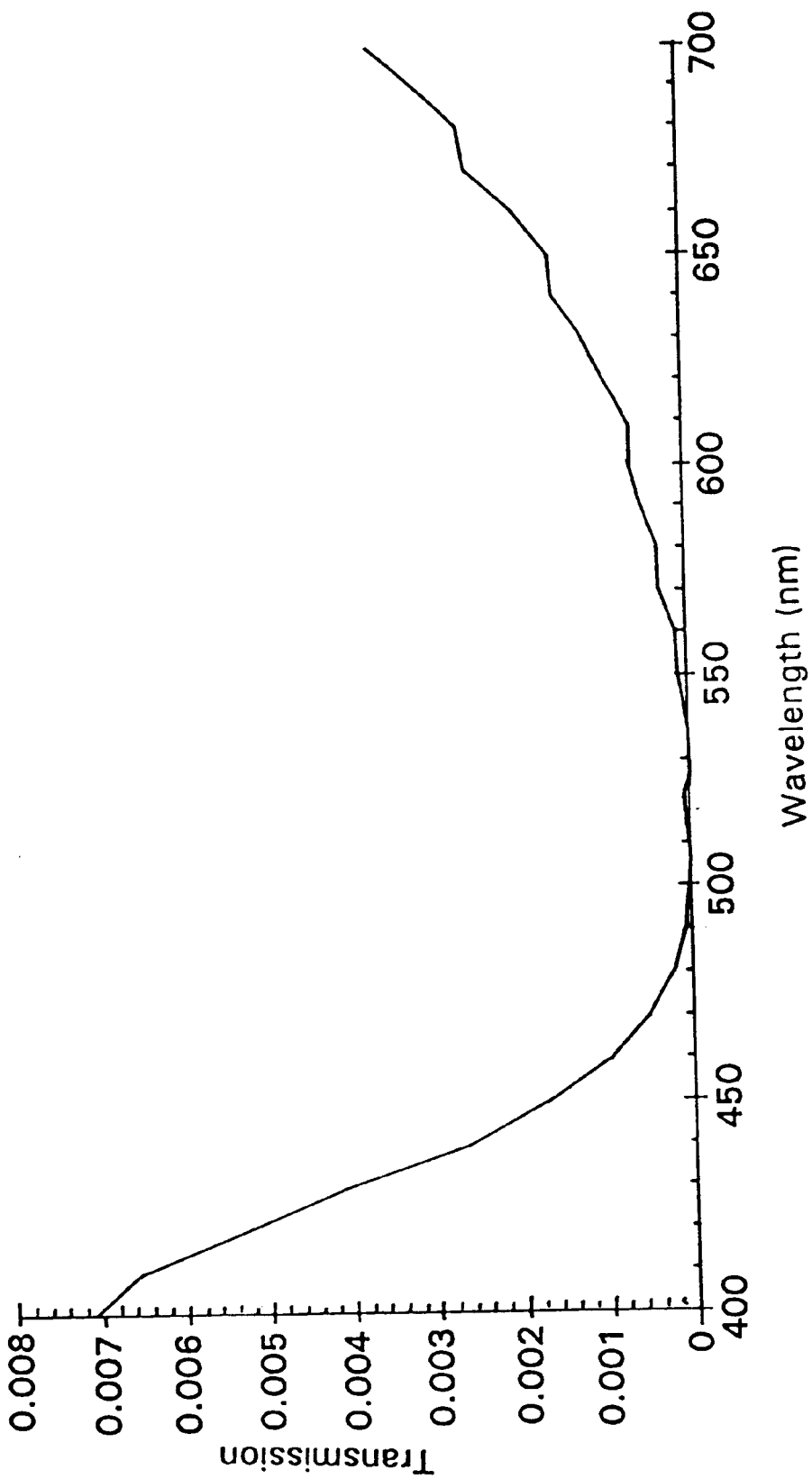
FIG. 7 is the measured off-state transmission spectrum of a compound-retarder achromatic shutter.

The measured transmission spectra indicate excellent agreement with the model results. FIG. 6 is a striking demonstration of the increased transmission over the visible spectrum provided by the achromatic shutter of this invention.

Figure 8:
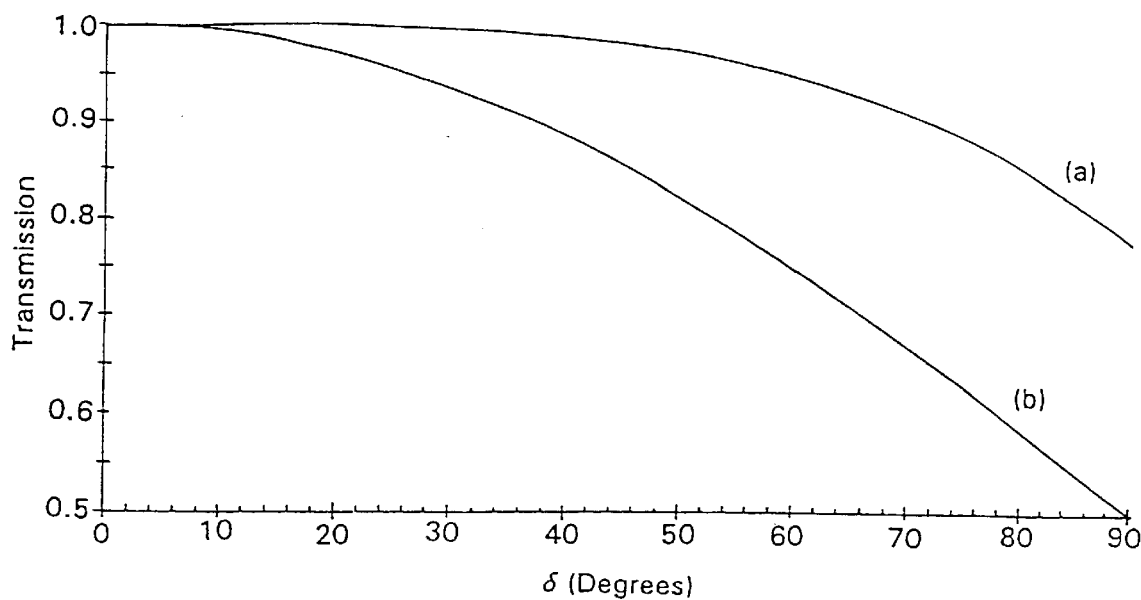
FIG. 8 is the calculated on-state transmission of (a) a compound-retarder achromatic shutter and (b) a single-retarder shutter as a function of the deviation from half-wave retardance, δ.
Figure 9:
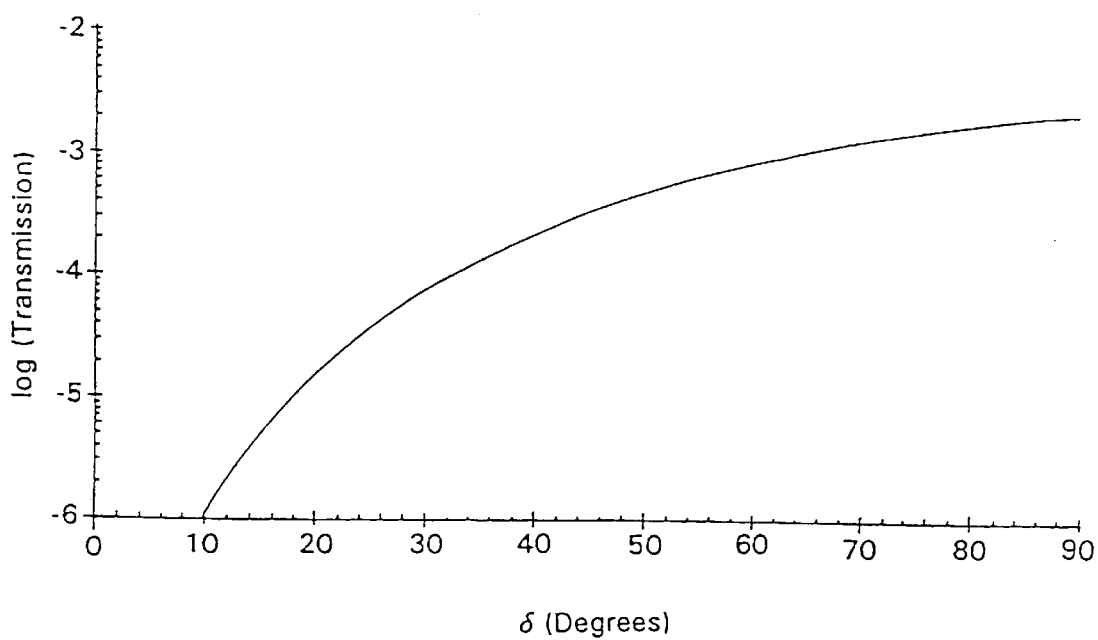
FIG. 9 is the calculated off-state transmission of a compound-retarder achromatic shutter as a function of δ.
Figure 10:
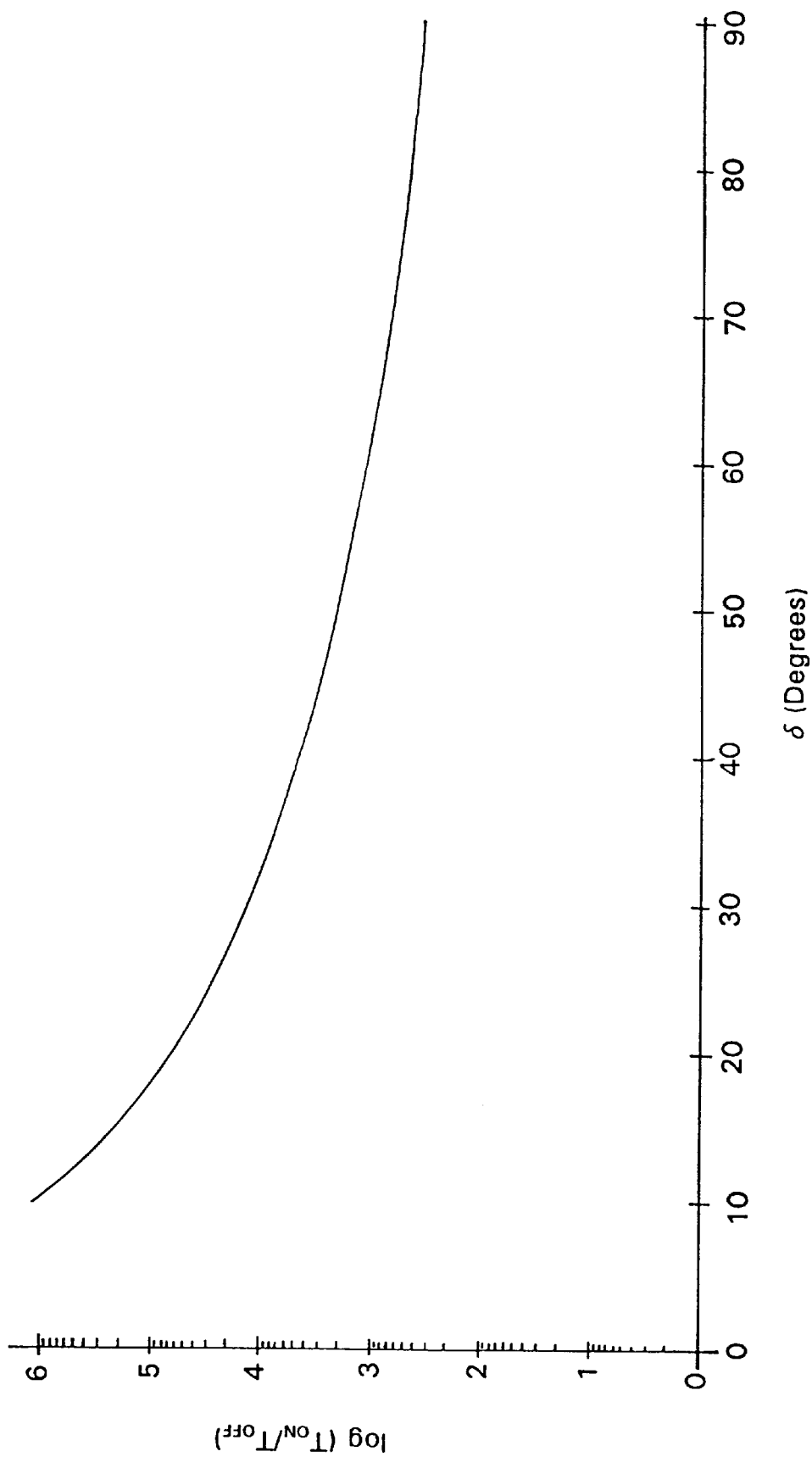
FIG. 10 is the calculated contrast ratio of a compound-retarder achromatic shutter as a function of δ.

The model was further used to calculate the on-state transmission of a compound-retarder achromatic shutter (Eq. 19) and a single retarder shutter (Eq. 1) as a function of $\delta$, the deviation from half-wave retardance. The calculated transmission spectra are shown is FIG. 8. FIG. 9 is the calculated off-state transmission of a compound-retarder shutter as a function of $\delta$, and FIG. 10 is the calculated contrast ratio.

Using the achromatic shutter at slightly longer center wavelengths, where FLC dispersion is greatly reduced, enormous operating bands are feasible. For instance, the calculated 95% transmission bandwidth of a shutter centered at 600 nm is approximately 400 nm (480 nm–880 nm), while that for a simple FLC shutter is only 150 nm (540 nm–690 nm).

Figure 11A:
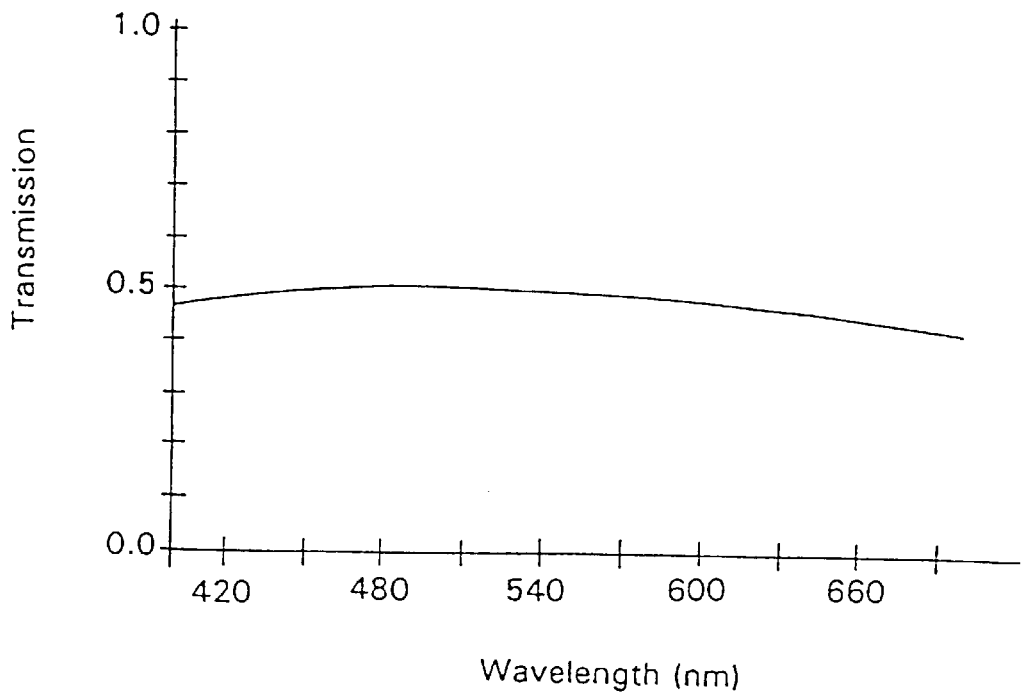
FIGS. 11a–11b, is the calculated on- and off-state transmission spectra of an achromatic shutter utilizing a compound quarter-wave retarder.
Figure 11B:
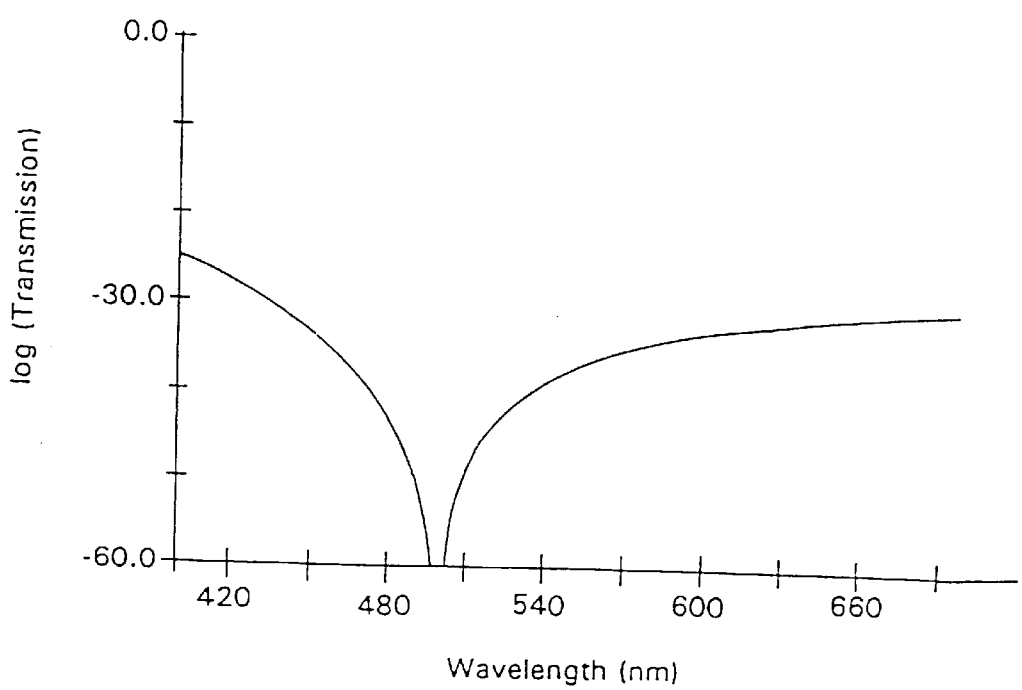

Achromatic polarization switches and shutters of this invention can also utilize compound retarders with composite retardances other than half-wave. For example, a polarization switch can be fabricated using a linear polarizer and a compound quarter-wave retarder. In one embodiment, the orientation of the compound retarder switches between $\pi/4$ and 0 with respect to the input polarizer, i.e. $\Omega+\alpha_1=45°$ and $\Omega'+\alpha_1=0°$. To achieve this, Eqs. 2–4 give $\Gamma_1^0=115°$, $\Delta=71°$, $\alpha_1=14°$ and $\alpha_2=85°$ in the on-state, and in the off-state $\Delta'=96°$, and $\alpha_2'=111°$. In the on-state the compound quarter-wave retarder switches the linear light to circularly polarized light and in the off-state the linear polarization is preserved. Addition of a second polarizer perpendicular to the first makes a shutter which switches between 50% transmission in the on-state and zero transmission in the off-state. The transmission spectra (FIGS. 11a–b) were calculated assuming no dispersion. Note that the off-state transmission spectrum is shown on a logarithmic scale in FIG. 11b.

The achromatic compound retarder, polarization switch and shutter of this invention have been illustrated with FLCs having two optic axis orientations. They can alternatively utilize more than two optic axis orientations and can have a continuously tunable optic axis.

The achromatic shutter of this invention can be utilized in applications such as CCD cameras, eye protection systems, glasses in virtual reality systems, three-color shutters in field-sequential display, beamsteerers, diffractive optics and for increasing the brightness of LC flat-panel displays.

Figure 12A:
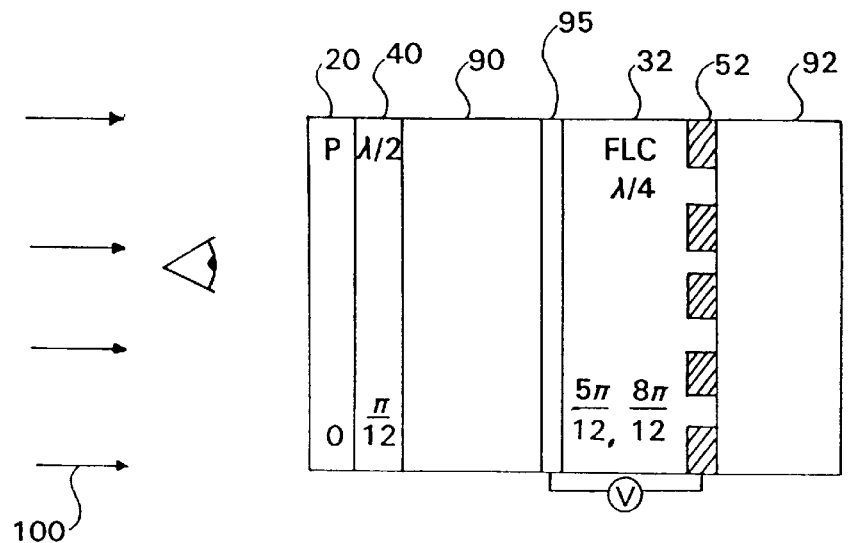
FIGS. 12a–12b, shows multiple-pixel reflection-mode achromatic shutters having (a) parallel polarizers and (b) crossed polarizers.
Figure 12B:
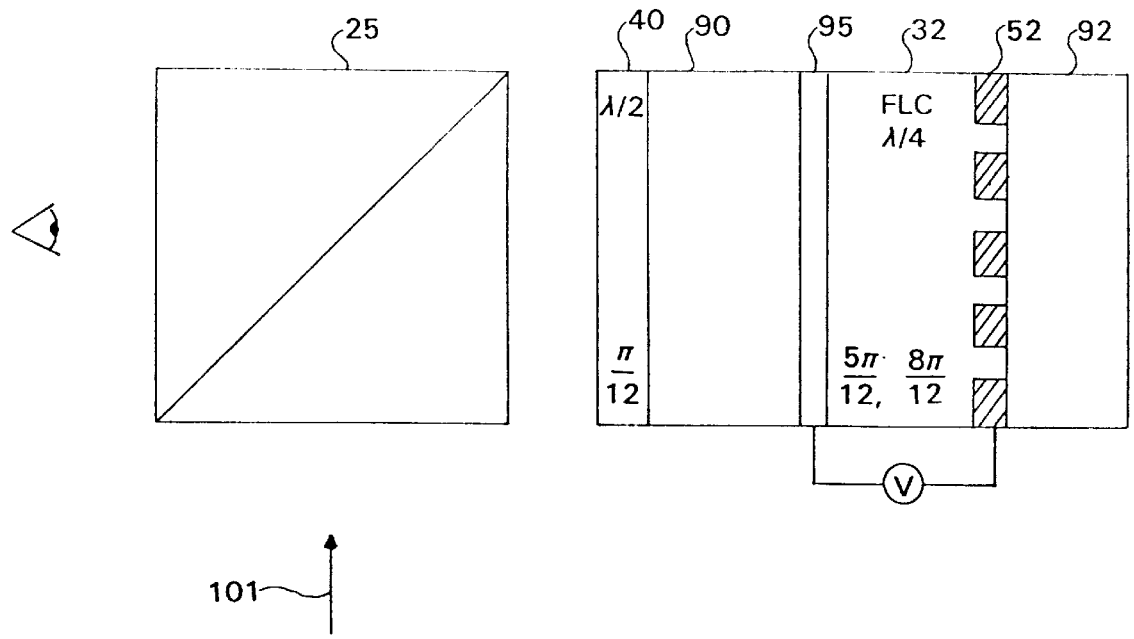
Figure 13:
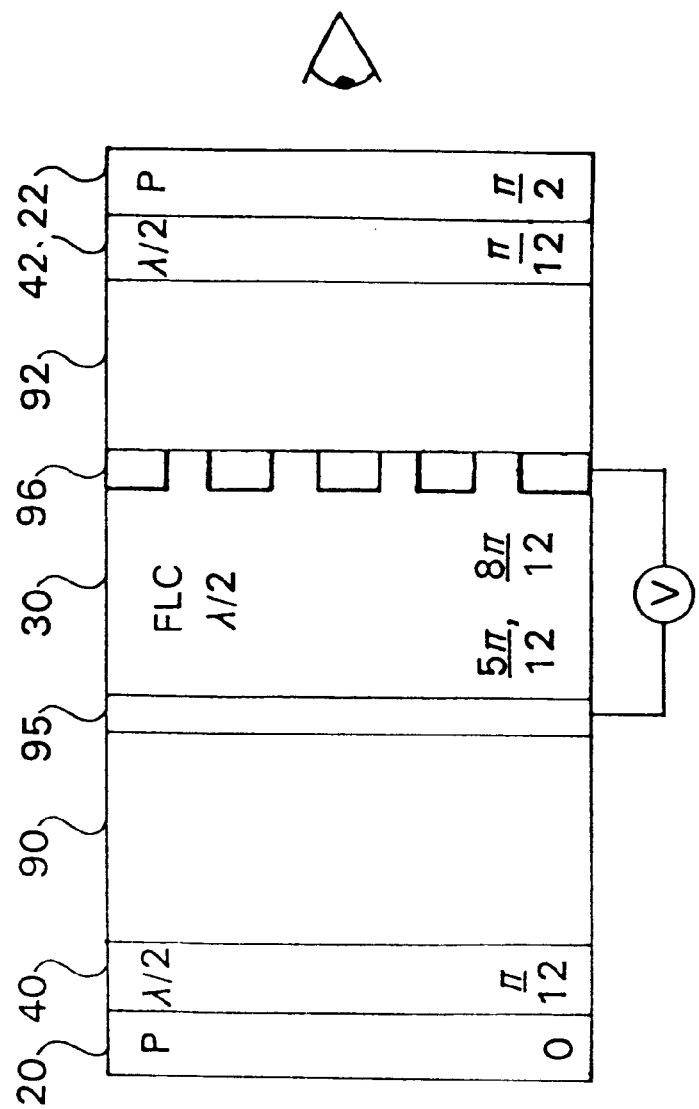
FIG. 13 is multiple-pixel transmission-mode achromatic shutter.
Figure 13:
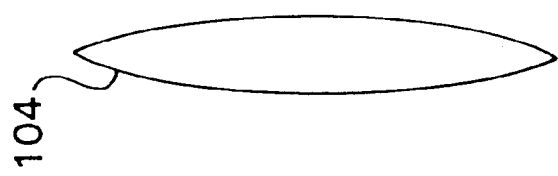
Figure 13:
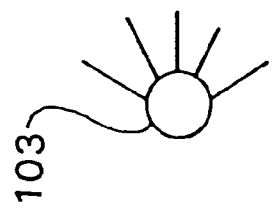

For many display applications the achromatic shutter can be used in a multiple-pixel array, as shown in FIGS. 12 and 13. In these drawings optical elements are shown in cross section and are represented by rectangular boxes. The retardance of birefringent elements is listed in the top of the box and the orientation is in the bottom. When elements can rotate between two or more orientations, both orientations are listed in the box and are separated by a comma.

Two reflection-mode embodiments are shown in FIG. 12. FLC retarder 32 has a quarter-wave retardance at the design wavelength and the optic axis is rotatable between $5\pi/12$ and $8\pi/12$. The FLC cell is formed with substrates 90 and 92. Voltages are applied to the FLC using transparent electrode 95 and pixellated mirror electrodes 52. Each pixel can be separately addressed to provide the desired display pattern. The compound retarder is formed by the FLC in combination with passive half-wave retarder 40, oriented at $\pi/12$.

In FIG. 12a the shutter array uses linear polarizer 20 oriented at 0. Since in reflection-mode polarizer 20 is both the input and output polarizer, this is a parallel polarizer embodiment. The array is illuminated by ambient light 100 and the viewer is represented by an eye. In FIG. 12b the array uses polarizing beam splitter 25 to create a crossed polarizer embodiment. White light 101 illuminates the array and modulated gray light is output to the viewer.

A transmission-mode array is illustrated in FIG. 13. In this embodiment the FLC has a half-wave retardance. Voltages are applied using transparent electrode 95 and pixellated transparent electrode 96. The compound retarder is formed by the FLC retarder in combination with outer retarders 40 and 42. The shutter is formed by polarizers 20 and 22 which, in this embodiment, are crossed. The array is illuminated by backlight assembly 103, which can be collimated by lens 104. The display is viewed in transmission.

The achromatic compound retarder of this invention has been demonstrated within an achromatic shutter. In addition it can be used in many other optical devices known in the art. In particular, it is suited to devices in which the retarder need be achromatic in only one orientation and wherein slight achromaticity in other orientations can be tolerated. Specific examples include polarization interference filters and dye-type color polarizing filters.

Numerous previous devices by the inventors can be improved by using the achromatic retarder of this invention. In the polarization interference filters of U.S. Pat. Nos. 5,132,826, 5,243,455 and 5,231,521, all of which are herein incorporated by reference in their entirety, a smectic liquid crystal rotatable retarder and a passive birefringent element are positioned between a pair of polarizers. In a preferred embodiment the birefringent element is oriented at $\pi/4$ with respect to a polarizer. In the split-element polarization interference filters of U.S. patent application 08/275,006, filed Jul. 12, 1994, which is herein incorporated by reference in its entirety, a center retarder unit and a pair of split-element retarder units are positioned between a pair of polarizers. The retarder units can include a rotatable liquid crystal retarder. The individual liquid crystal rotatable retarders of the above-mentioned polarization interference filters can be replaced with the compound achromatic retarders of the present invention.

The liquid crystal handedness switch and color filters described in U.S. patent application 08/131,725, filed Oct. 5, 1993, which is herein incorporated by reference in its entirety, can also be improved by using the achromatic retarders of the present invention. The circular polarization handedness switch and the linear polarization switch comprise a linear polarizer and a rotatable liquid crystal retarder. The color filters use the polarization switch in combination with a color polarizer, such as a cholesteric circular polarizer or a pleochroic linear polarizer. The simple liquid crystal rotatable retarders described in the handedness switch invention can be replaced with the compound achromatic retarders of the present invention.

The compound achromatic retarder can also be used to improve other color filters known in the art, for example as described in Handschy et al., U.S. Pat. No. 5,347,378 which is herein incorporated by reference in its entirety. These color filters comprise a linear polarizer and a rotatable liquid crystal retarder. In some embodiments they further comprise pleochroic polarizers and in other embodiments they further comprise a second linear polarizer and a passive birefringent element. The simple liquid crystal rotatable retarder of the Handschy et al. invention can be replaced with the compound achromatic retarders of the present invention.

The color filters of this invention can be temporally multiplexed, wherein the output color is switched on a timescale which is rapid compared to a slow response time detector, such as the human eye. The compound retarder of FIG. 2a employing the smectic liquid crystal cell is particularly suited to this application.

The criterion for replacing a single retarder with the achromatic compound retarder of this invention is that the single retarder must be rotatable between two or more orientations of the optic axis. The compound retarder is especially suited for use in devices wherein it is positioned adjacent to a linear polarizer and wherein the orientation of the retarder is, in one of its switching states, parallel to the linear polarizer. The achromaticity of the compound retarder is particularly advantageous in color filtering devices because it can increase the throughput across the entire visible spectrum.

The compound retarder of this invention can also be used in optical devices to replace a pair of variable retarders wherein the first and second variable retarders have first and second fixed orientations and have retardances switchable between first and second levels, and wherein the retardances are synchronously switched between opposite levels. In addition, since the achromatic half-wave retarder can be used to rotate the orientation of linearly polarized light, it can replace twisted nematic cells in optical devices.

Figure 14:
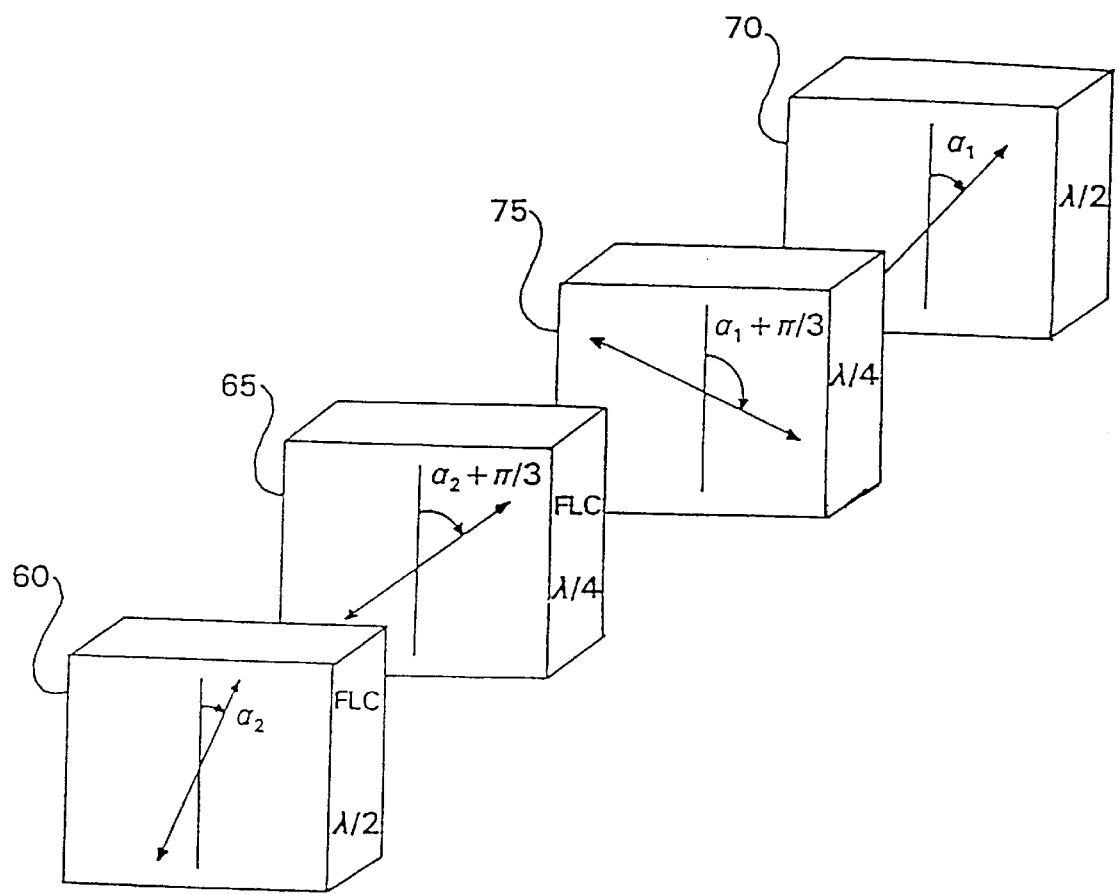
FIG. 14 is a compound achromatic variable retarder comprising a pair of liquid crystal retarders and a pair of passive retarders.

In addition to the compound achromatic retarder, this invention provides an achromatic variable retarder, illustrated in FIG. 14. An active section comprises smectic liquid crystal half-wave retarder 60, oriented at $\alpha_2$, and smectic liquid crystal quarter-wave retarder 65, oriented at $\alpha_2+\pi/3$. Angle $\alpha_2$ of retarders 60 and 65 is electronically tuned, preferably synchronously. A passive section comprises passive quarter-wave retarder 75, oriented at $\alpha_1+\pi/3$, and passive half-wave retarder 70, oriented at $\alpha_1$. Angle $\alpha_1$ is fixed. The angle $\alpha_2$ of the liquid crystal retarder orientation can be rotated discreetly or continuously to at least one other angle, $\alpha_2'$. The retardance of the compound structure is $2(\pi/2-\alpha_2+\alpha_1)$.

What is claimed is:

1. An achromatic compound retarder, comprising:

a first passive retarder unit having a predetermined retardance at a design wavelength and having a predetermined optic axis orientation;

a second passive retarder unit having the predetermined retardance at the design wavelength and having substantially the same predetermined optic axis orientation as the first passive retarder unit; and a central retarder unit positioned between the first and second passive retarder units, the central retarder unit having a retardance of approximately $\pi$ at the design wavelength and an optic axis orientation switchable between at least a first orientation state and a second orientation state, wherein the compound retardance is substantially achromatic when the optic axis of the central retarder unit is in the first orientation state.

2. The achromatic compound retarder of claim 1, wherein the optic axis orientation of the compound retarder is substantially achromatic when the optic axis of the central retarder unit is in the second orientation state.

3. The achromatic compound retarder of claim 1, wherein the central retarder unit comprises a planar-aligned retarder having an optic axis orientation which is electronically rotatable between at least the first orientation state and the second orientation state.

4. The achromatic compound retarder of claim 1, wherein the central retarder unit comprises a plurality of variable retarders having fixed optic axis orientations, a first one of the variable retarders having a first retardance at the first orientation state of the central retarder unit, and a second one of the variable retarders having a second retardance at the second orientation state of the central retarder unit.

5. The achromatic compound retarder of claim 4, wherein the first retardance is approximately $\pi$ and the second retardance is approximately $\pi$.

6. The achromatic compound retarder of claim 5, wherein at least one of the first and second ones of the variable retarders have associated passive retarders to compensate for non-zero residual retardance.

7. The achromatic compound retarder of claim 1, wherein the optic axis of the central retarder unit is adapted to rotate continuously between a range of orientations including the first and second orientations states.

8. The achromatic compound retarder of claim 1, wherein the optic axis of the central retarder is switchable between at least two discreet orientation states.

9. The achromatic compound retarder of claim 8, wherein the central retarder unit is bistable and the at least two discreet orientation states are the first and second orientation states.

10. A polarization switch, comprising:
the achromatic compound retarder of claim 1; and
a first linear polarizer optically coupled to the compound retarder.

11. The polarization switch of claim 10, wherein the second optic axis orientation state of the central retarder unit is parallel to an orientation of the first linear polarizer.

12. An achromatic shutter, comprising:
the polarization switch of claim 10, and
a second linear polarizer optically coupled to the compound retarder, the compound retarder being located optically between the first and second linear polarizers.

13. An achromatic compound retarder, comprising:
a passive retarder unit having a predetermined retardance at a design wavelength and having a predetermined optic axis orientation;
a reflector; and
a central retarder unit positioned between the passive retarder unit and the reflector, the central retarder unit having a retardance of approximately $\pi/2$ at the design wavelength and an optic axis orientation switchable between at least a first orientation state and a second orientation state,
wherein the compound retardance is substantially achromatic when the optic axis of the central retarder unit is in the first orientation state.

14. The achromatic compound retarder of claim 13, wherein the optic axis orientation of the compound retarder is substantially achromatic when the optic axis of the central retarder unit is in the second orientation state.

15. The achromatic compound retarder of claim 13, wherein the central retarder unit comprises a planar-aligned retarder having an optic axis orientation which is electronically rotatable between at least the first orientation state and the second orientation state.

16. The achromatic compound retarder of claim 13, wherein the central retarder unit comprises a plurality of variable retarders having fixed optic axis orientations, a first one of the variable retarders having a first retardance at the first orientation state of the central retarder unit, and a second one of the variable retarders having a second retardance at the second orientation state of the central retarder unit.

17. The achromatic compound retarder of claim 16, wherein the first retardance is approximately $\pi/2$ and the second retardance is approximately $\pi/2$.

18. The achromatic compound retarder of claim 17, wherein at least one of the first and second ones of the variable retarders have associated passive retarders to compensate for non-zero residual retardance.

19. The achromatic compound retarder of claim 13, wherein the optic axis of the central retarder unit is adapted to rotate continuously between a range of orientations including the first and second orientations states.

20. The achromatic compound retarder of claim 13, wherein the optic axis of the central retarder is switchable between at least two discreet orientation states.

21. The achromatic compound retarder of claim 20, wherein the central retarder unit is bistable and the at least two discreet orientation states are the first and second orientation states.

22. A polarization switch, comprising:
the achromatic compound retarder of claim 16; and
a linear polarizer optically coupled to the compound retarder.

23. The polarization switch of claim 22, wherein the second optic axis orientation state of the central retarder unit is parallel to an orientation of the polarizer.

24. A method of imparting an achromatic retardance on a light beam, comprising:
passing the light beam through a first passive retarder unit having a predetermined retardance at a design wavelength and having a predetermined optic axis orientation;
passing the light beam through a central retarder unit at least once, the central retarder unit having an optic axis orientation switchable between at least a first orientation state and a second orientation state; and
passing the light beam through one of the first passive retarder unit and a second passive retarder unit having the predetermined retardance at the design wavelength and having substantially the same predetermined optic axis orientation as the first passive retarder unit,
wherein the retardance of the central retarder unit at the design wavelength is $\pi$ divided by the number of passes the light beam makes through the central retarder unit, and the retardance imparted on the light beam is substantially achromatic when the central retarder unit is in the first orientation state.

25. The method of claim 24, wherein the step of passing the light beam through a central retarder at least once comprises the steps of:
passing the light beam through the central retarder; and
reflecting the light beam back through the central retarder.

26. An achromatic compound retarder, comprising:
means for passing a light beam through a first passive retarder unit having a predetermined retardance at a design wavelength and having a predetermined optic axis orientation;
means for passing the light beam through a central retarder unit at least once, the central retarder unit having an optic axis orientation switchable between at least a first orientation state and a second orientation state; and
means for passing the light beam through one of the first passive retarder unit and a second passive retarder unit having the predetermined retardance at the design wavelength and having substantially the same predetermined optic axis orientation as the first passive retarder unit,
wherein the retardance of the central retarder unit at the design wavelength is $\pi$ divided by the number of passes the light beam makes through the central retarder unit, and the retardance imparted on the light-beam is substantially achromatic when the central retarder unit is in the first orientation state.

* * * * *